United States Patent
Floch et al.

(10) Patent No.: US 9,503,153 B2
(45) Date of Patent: Nov. 22, 2016

(54) SPREAD SPECTRUM GMSK SIGNALS

(71) Applicant: Airbus DS GmbH, Taufkirchen (DE)

(72) Inventors: Jean-Jacques Floch, Munich (DE); Francis Soualle, Munich (DE); Jan Wendel, Munich (DE)

(73) Assignee: Airbus DS GmbH, Taufkirchen (DE)

( * ) Notice: Subject to any disclaimer, the term of this patent is extended or adjusted under 35 U.S.C. 154(b) by 0 days.

(21) Appl. No.: 14/844,740

(22) Filed: Sep. 3, 2015

(65) Prior Publication Data

US 2016/0072546 A1    Mar. 10, 2016

(30) Foreign Application Priority Data

Sep. 4, 2014    (EP) .................................... 14003057
Nov. 26, 2014   (EP) .................................... 14290353

(51) Int. Cl.
*H04B 1/00*     (2006.01)
*H04B 1/709*    (2011.01)
(Continued)

(52) U.S. Cl.
CPC ............ *H04B 1/709* (2013.01); *H04L 27/2017* (2013.01); *H04L 27/364* (2013.01); *H04B 2001/70724* (2013.01); *H04J 13/0022* (2013.01)

(58) Field of Classification Search
CPC .......... H04B 1/709; H04B 1/707; G01S 19/30
(Continued)

(56) References Cited

U.S. PATENT DOCUMENTS

2005/0094711 A1* 5/2005 Miller ................. H04L 27/2017
                                                     375/146
2012/0025882 A1* 2/2012 Shanan ................ H03L 7/0893
                                                     327/157
2012/0039410 A1* 2/2012 Feher ...................... H04L 27/34
                                                     375/261

FOREIGN PATENT DOCUMENTS

EP         1678837 A4    1/2012
WO    WO 2005/043767 A2  5/2005

OTHER PUBLICATIONS

Extended European Search Report dated Feb. 16, 2015 (Eleven (11) pages).

(Continued)

*Primary Examiner* — Khai Tran
(74) *Attorney, Agent, or Firm* — Crowell & Moring LLP

(57) ABSTRACT

A method for generating a spread spectrum Gaussian Minimum Shift Keying (GMSK) signal includes obtaining a sequence of data symbols for a data channel, obtaining at least one first spread spectrum code comprising a first sequence of spread spectrum chips for the data channel, obtaining at least one second spread spectrum code comprising a second sequence of spread spectrum chips for a pilot channel, and generating a sequence of pre-modulation chips by combining the sequence of data symbols for the data channel with the spread spectrum chips of the first sequence of the at least one first spread spectrum code and data symbols for the pilot channel with the spread spectrum chips of the second sequence of the at least one second spread spectrum code to a combined sequence of chips. The method further includes assigning the chips of the combined sequence of chips to the transmission channels In-Phase I and Quadrature Q of the spread spectrum GMSK signal so that not more than two consecutive pre-modulation chips generated with the same spread spectrum code are transmitted in the same transmission channel I or Q, and performing GMSK modulation using the sequence of pre-modulation chips to generate a spread spectrum GMSK signal.

9 Claims, 18 Drawing Sheets

(51) Int. Cl.
    *H04L 27/20* (2006.01)
    *H04L 27/36* (2006.01)
    *H04J 13/00* (2011.01)
    *H04B 1/707* (2011.01)

(58) Field of Classification Search
    USPC ........ 375/150, 146, 260, 267, 309; 370/320, 370/342
    See application file for complete search history.

(56) References Cited

OTHER PUBLICATIONS

Emmanuele et al.: "Spread-Spectrum Continuous-Phase-Modulated Signals for Satellite Navigation", IEEE Transactions on Aerospace and Electronic Systems, IEEE Service Center, Piscataway, NJ, US, vol. 48, No. 4, Oct. 1, 2012, pp. 3234-3249, XP011467238.
Wakaki et al.: DS/SS/GMSK with differential detection over multipath Rayleigh fading channels, IEEE ISSSTA. IEEE International Symposium on Spread Spectrumtechniques and Applications, vol. 1, Jan. 1, 1996, pp. 399-403, XP002158465.
European Search Report issued in European counterpart application No. 14290353.3-1851 dated Jan. 19, 2016 (Twelve (12) pages).
Wakaki et al., "DS/SS/GMSK with differential detection over multipath Rayleigh fading channels", IEEE ISSSTA. IEEE International Symposium on Spread Spectrumtechniques and Applications, XX, XX, vol. 1, Jan. 1, 1996, pp. 399-403, XP002158465.
Emmanuele et al., "Spread-Spectrum Continuous-Phase-Modulated Signals for Satellite Navigation", IEEE Transactions on Aerospace and Electronic Systems, IEEE Service Center, Piscataway, NJ, US, vol. 48, No. 4, Oct. 1, 2012, pp. 3234-3249, XP011467238.

* cited by examiner

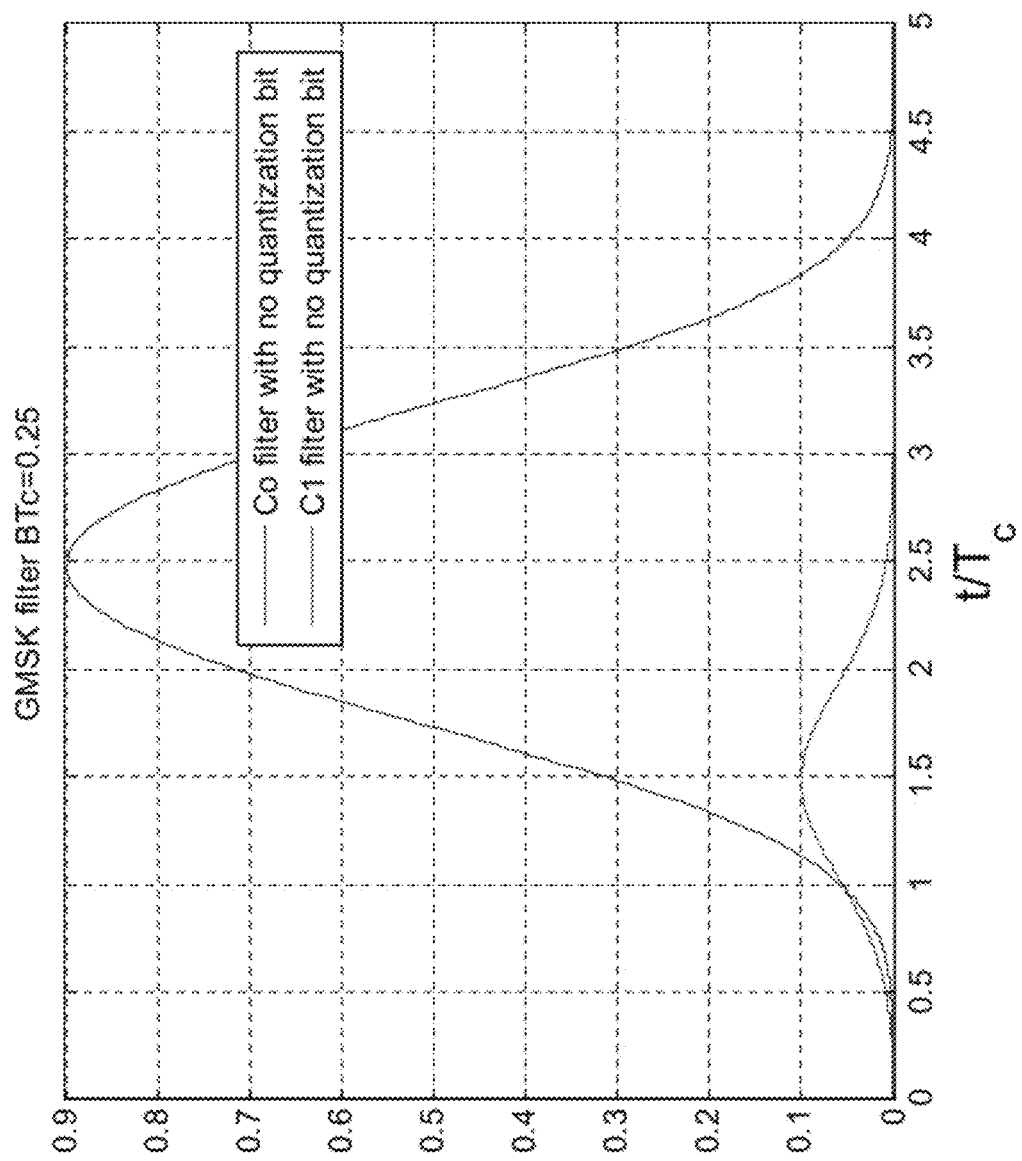

SPREAD SPECTRUM GMSK SIGNALS

CROSS REFERENCE TO RELATED APPLICATION

This application claims priority under 35 U.S.C. §119 from European Patent Application No. 14 003 057.8, filed Sep. 4, 2014, and European Patent Application No. 14 290 353.3, filed Nov. 26, 2014, the entire disclosures of which are herein expressly incorporated by reference.

TECHNICAL FIELD

The invention relates to improvements of spread spectrum GMSK (Gaussian Minimum Shift Keying) signals, particularly for usage in a GNSS (Global Navigation Satellite System).

BACKGROUND OF THE INVENTION

GMSK modulation of signals is used in many digital communication systems such as GSM (Global System for Mobile Communication). GMSK modulation, which is a FSK (Frequency Shift Keying) modulation method using a Gaussian filter, is very efficient in using the available frequency spectrum. However, it suffers from intra-symbol interference (ISI), which causes degradation on the bits modulations. Therefore, digital communication systems using GMSK often apply equalizers, which are capable of compensating distortions due to ISI such as the Viterbi algorithm.

It is known in the art to use GMSK coupled with CDMA (Code Division Multiple Access). This technique is for example used in digital communication technology since GMSK offers very good spectrum efficiency. However, ISI caused by GMSK widens the correlation function of CDMA. This may cause inter-chip interference (ICI) due to the fact that the CCF (Cross Correlation Function) is usually no longer limited between ±1 chip. The larger the GMSK filter is, i.e. the lower the BT factor of the filter, the higher are the CCF values outside ±1 chip. The tracking performance for spread spectrum GMSK signals is therefore degraded compared to a BPSK (Binary Phase Shift Keying) modulated signal with the same chipping rate.

The European patent application EP1678837A1, published under the international publication number WO2005/043767A2, presents methods, apparatuses, and systems for transmitting and receiving spread spectrum GMSK signals. Transmission may involve obtaining a sequence of data symbols, obtaining a spread spectrum code comprising a sequence of spread spectrum chips, generating a sequence of pre-modulation chips by combining the sequence of data symbols with the spread spectrum chips, wherein for each data symbol, at least one of the pre-modulation chips is generated by taking into account at least the data symbol and at least one of the spread spectrum chips, performing GMSK modulation using the sequence of pre-modulation chips to produce a spread spectrum GMSK signal, and transmitting the spread spectrum GMSK signal.

A GNSS such as (NAVSTAR-)GPS (Global Positioning System) or the future European GNSS GALILEO use DSSS (Direct Sequence Spread Spectrum) modulation of the carrier frequencies reserved for the respective GNSS in order to transmit navigation data from the GNSS satellites of the space segment to GNSS receivers of the user segment. New signal designs for the modernization of GPS and for GALILEO introduce the use of longer spreading codes for improving the correlation properties and data less channels (pilot) in addition to data channels (data) for aiding weak signal tracking.

SUMMARY OF THE INVENTION

It is an object of the present invention to provide a modified blanking approach for signals, particularly CDMA signals, which may reduce the reduction of the SNIR by noise blanking.

It is an object of the present invention to further improve spread spectrum GMSK signals, particularly with regard to ICI.

This object is achieved by the subject matter of the independent claims. Further embodiments are shown by the dependent claims.

The invention proposes to use different spread spectrum codes comprising sequences of spread spectrum chips, particularly PN (Pseudo-Random Noise) sequences, for a pilot and a data channel of a spread spectrum GMSK signal, to generate a sequence of pre-modulation chips by combining the sequences of data symbols of the data channel and the pilot channel with the respective sequences of spread spectrum chips, and to assign the pre-modulation chips belonging to the data channel and the pilot channel to the transmission channels In-Phase- and Quadrature of the spread spectrum GMSK signal so that not more than two consecutive pre-modulation chips generated with the same spread spectrum code are transmitted in the same transmission channel I or Q. With this method, the ICI can be reduced due to the isolation of the data and pilot spreading codes by distributing their pre-modulation chips on different transmission channels.

An embodiment of the invention relates to a method for generating a spread spectrum Gaussian Minimum Shift Keying, GMSK, signal comprising: obtaining a sequence $D(t)$ of data symbols for a data channel, obtaining at least one first spread spectrum code comprising a first sequence $C^D(t)$ of spread spectrum chips for the data channel, obtaining at least one second spread spectrum code comprising a second sequence $C^P(t)$ of spread spectrum chips for a pilot channel, generating a sequence $r(t)$ of pre-modulation chips by combining the sequence $D(t)$ of data symbols for the data channel with the spread spectrum chips of the first sequence $C^D(t)$ of the at least one first spread spectrum code and data symbols for the pilot channel with the spread spectrum chips of the second sequence $C^P(t)$ of the at least one second spread spectrum code to a combined sequence of chips, assigning the chips of the combined sequence of chips to the transmission channels In-Phase I and Quadrature Q of the spread spectrum GMSK signal so that not more than two consecutive pre-modulation chips generated with the same spread spectrum code are transmitted in the same transmission channel I or Q, and performing GMSK modulation $g(t)$ using the sequence of pre-modulation chips to generate a spread spectrum GMSK signal $s(t)$.

According to a first assignment strategy, one first spread spectrum code and one second spread spectrum code may be obtained, and pre-modulation chips generated with the first spread spectrum code may be assigned to the transmission channels In-Phase I and Quadrature Q of the spread spectrum GMSK signal so that two consecutive pre-modulation chips generated with the first spread spectrum code are transmitted in different transmission channels I or Q, and pre-modulation chips generated with the second spread spectrum code may be assigned to the transmission channels In-Phase I and Quadrature Q of the spread spectrum GMSK signal so that two consecutive pre-modulation chips generated with the second spread spectrum code are transmitted in different transmission channels I or Q.

According to a second assignment strategy, two or more first spread spectrum codes and two or more second spread spectrum codes may be obtained, and pre-modulation chips generated with the first spread spectrum codes may be assigned to the transmission channel In-Phase I of the spread spectrum GMSK signal by interleaving the pre-modulation chips so that not more than two consecutive pre-modulation chips generated with the same one of the first spread spectrum codes are transmitted in the transmission channel I, and pre-modulation chips generated with the second spread spectrum codes may be assigned to the transmission channel Quadrature Q of the spread spectrum GMSK signal by interleaving the pre-modulation chips so that not more than two consecutive pre-modulation chips generated with the same one of the second spread spectrum codes are transmitted in the transmission channel Q.

A further embodiment of the invention relates to a method for receiving a spread spectrum Gaussian Minimum Shift Keying, GMSK, signal generated according to a method of the invention and as disclosed herein comprising: generating a first reference signal $s_{ref1}(t)$ considering that a first data symbol has been transmitted with the received spread spectrum GMSK signal, generating a second reference signal $s_{ref2}(t)$ considering that a second data symbol has been transmitted with the received spread spectrum GMSK signal, simultaneously evaluating a first correlation function of the received spread spectrum GMSK signal and the first reference signal $s_{ref1}(t)$ and a second correlation function of the received spread spectrum GMSK signal and the second reference signal $s_{ref2}(t)$, determining the highest value among the punctual correlations of the evaluated first and second correlation function, selecting the first reference signal $s_{ref1}(t)$ or the second reference signal $s_{ref2}(t)$ depending on the determined highest value, and determining the integration time used for performing a correlation of the received spread spectrum GMSK signal with a first or second spread spectrum code depending on the selected first reference signal $s_{ref1}(t)$ or second reference signal $s_{ref2}(t)$.

Another embodiment relates to a method for receiving a spread spectrum Gaussian Minimum Shift Keying, GMSK, signal generated according to a method of the invention and as disclosed herein comprising: generating a reference signal $s_{ref}(t)$ according to the following equation:

$$S_{ref}(t) = A\left(\sum_{k=0}^{\frac{N_c-2}{2}} [a_{2k} \cdot C_0(t - 2kT_c) + b_{2k} \cdot C_0(t - (2k+1)T_c)]\right) + jA\sum_{k=0}^{\frac{N_c-2}{2}} \left[a_{2k+1} \cdot C_0\left(t - 2kT_c - \frac{T_c}{2}\right) + b_{2k+1} \cdot C_0\left(t - (2k+1)T_c - \frac{T_c}{2}\right)\right],$$

where A denotes the coefficient of normalization of the signal, $a_k$ denotes the pilot spreading or spread spectrum code of the PN sequences, and $b_k$ denotes the data spreading or spread spectrum code PN sequences. $T_c$ is the chip period and $N_c$ the length of the PN sequence, i.e. the number of spread spectrum chips of the PN sequence of the spread spectrum code used for spreading the symbols to be transmitted, particularly the data symbols of the data channel. $C_0$ is a GMSK (Gaussian) filter. This allows to design a relatively simple and low cost implementable receiver architecture based on the simplification of the Laurent decomposition equation.

The method can further comprise the step of replacing the data spreading or spread spectrum code PN sequences $b_k$ by a sequence of zeros with the same length for tracking the pilot channel or replacing the pilot spreading or spread spectrum code PN sequences $a_k$ by a sequence of zeros with the same length for tracking the data channel.

A yet further embodiment of the invention relates to a spread spectrum Gaussian Minimum Shift Keying, GMSK, signal generator comprising: a data stream generator for generating a sequence D(t) of data symbols for a data channel, a spread spectrum code generator for generating at least one first spread spectrum code comprising a first sequence $C^D(t)$ of spread spectrum chips for the data channel and at least one second spread spectrum code comprising a second sequence $C^P(t)$ of spread spectrum chips for a pilot channel, a combiner for combining the sequence D(t) of data symbols for the data channel with the spread spectrum chips of the first sequence $C^D(t)$ of the at least one first spread spectrum code and data symbols for the pilot channel with the spread spectrum chips of the second sequence $C^P(t)$ of the at least one second spread spectrum code to a combined sequence of chips, a pre-modulation chip sequence generator for generating a sequence r(t) of pre-modulation chips from the combined sequence of chips by assigning the chips of the combined sequence of chips to the transmission channels In-Phase I and Quadrature Q of the spread spectrum GMSK signal so that not more than two consecutive pre-modulation chips generated with the same spread spectrum code are transmitted in the same transmission channel I or Q, a Gaussian filter for filtering the generated sequence r(t) of pre-modulation chips, a quadrature modulator for generating an In-Phase signal by using the chips assigned to the In-Phase I transmission channel and a Quadrature signal the chips assigned to the Quadrature Q transmission channel and summing the generated In-Phase signal and Quadrature signal, and an integrator for integrating the summed In-Phase signal and Quadrature signal to generate a spread spectrum GMSK signal s(t).

The spread spectrum code generator may be adapted to generate one first spread spectrum code and one second spread spectrum code, and the pre-modulation chip sequence generator may be adapted to assign pre-modulation chips generated with the first spread spectrum code to the transmission channels In-Phase I and Quadrature Q of the spread spectrum GMSK signal so that two consecutive pre-modulation chips generated with the first spread spectrum code are transmitted in different transmission channels I or Q, and to assign pre-modulation chips generated with the second spread spectrum code to the transmission channels In-Phase I and Quadrature Q of the spread spectrum GMSK signal so that two consecutive pre-modulation chips generated with the second spread spectrum code are transmitted in different transmission channels I or Q.

Alternatively, the spread spectrum code generator may be adapted to generate two or more first spread spectrum codes and two or more second spread spectrum codes, and the pre-modulation chip sequence generator may adapted to assign pre-modulation chips generated with the first spread spectrum codes to the transmission channel In-Phase I of the spread spectrum GMSK signal by interleaving the pre-modulation chips so that not more than two consecutive pre-modulation chips generated with the same one of the first spread spectrum codes are transmitted in the transmission channel I, and to assign pre-modulation chips generated with the second spread spectrum codes to the transmission channel Quadrature Q of the spread spectrum GMSK signal by interleaving the pre-modulation chips so that not more than two consecutive pre-modulation chips generated with the same one of the second spread spectrum codes are transmitted in the transmission channel Q.

The spread spectrum GMSK signals generated according to the present invention are particularly suitable for application in a GNSS, namely for generating GNSS signals. A spread spectrum GMSK signal generator according to the invention and as described herein can be for example implemented in a GNSS satellite for generating and transmitting spread spectrum GMSK modulated GNSS signals.

These and other aspects of the invention will be apparent from and elucidated with reference to the embodiments described hereinafter.

The invention will be described in more detail hereinafter with reference to exemplary embodiments. However, the invention is not limited to these exemplary embodiments.

BRIEF DESCRIPTION OF THE DRAWINGS

FIG. 1A-C shows plots of $C_0$ and $C_1$ GMSK filters for different BT values $BT_c=0.5$, $BT_c=0.3$ and $BT_c=0.25$;

DESCRIPTION OF PREFERRED EMBODIMENTS

Figure 1A:
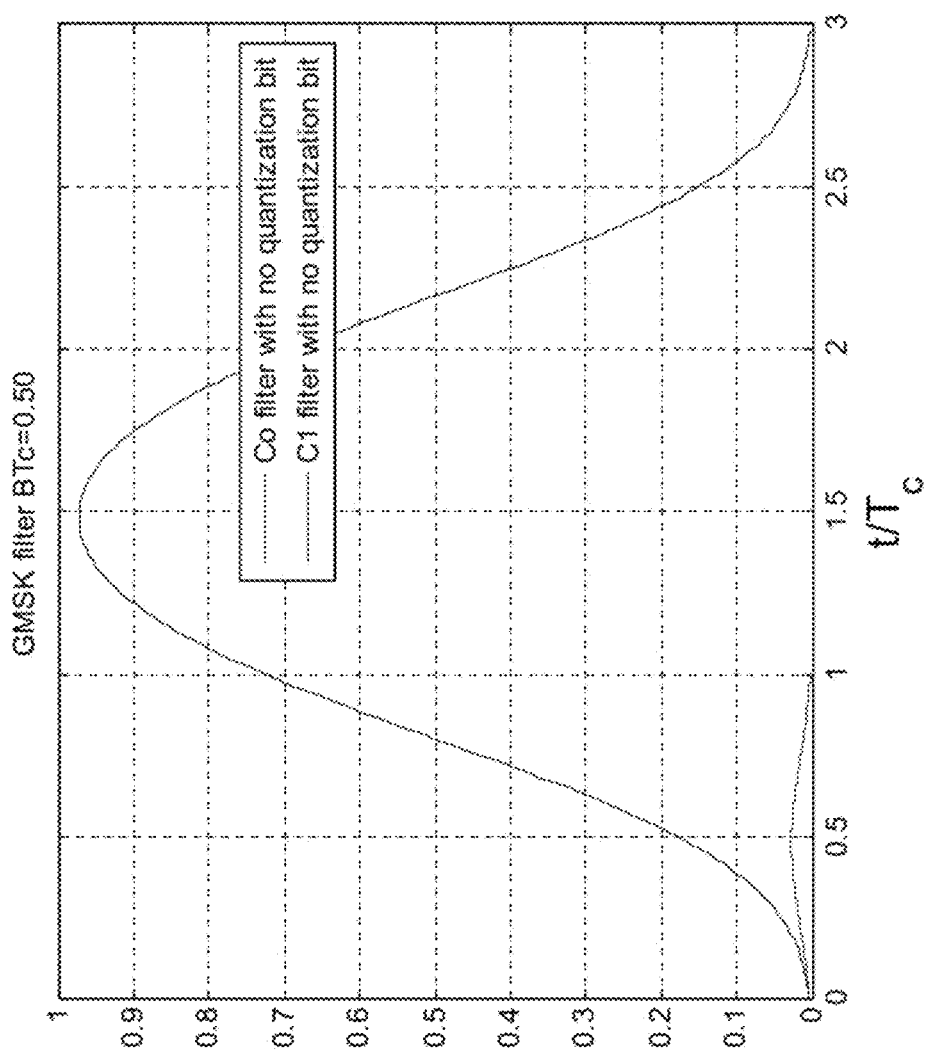

In the following, functionally similar or identical elements may have the same reference numerals. Absolute values are shown below by way of example only and should not be construed as limiting the invention.

In the following, the PSD and CCF of a typical GMSK CDMA signal are described for different BT values of the GMSK filters used for generating the GMSK CDMA signal. Also, the problem of ICI caused by the GMSK filters is explained with regard to the CCF and the tracking performance. The following description is related to a GMSK CDMA signal as it is used for a GNSS such as the modernized GPS or GALILEO according to the new signal design with a pilot channel, which does not contain data (and, thus, is a data less channel in terms of data usable for positioning or navigation purposes), and a data channel for transmitting data usable by GNSS receivers for position determination. Even if the following description is related to the usage in a GNSS, it can in principle be used for other applications, if a pilot and data channel is provided.

A GMSK CDMA signal or spread spectrum GMSK signal S(t) can be well approximated with the following equation (according to the Laurent decomposition):

$$S(t) \approx A \sum_{k=0}^{N_c-1} \left[ a_k \cdot C_0(t-kT_c) - b_k a_{k-1} \cdot C_1\left(t-kT_c-\frac{T_c}{2}\right)\right] + jA \sum_{k=0}^{N_c-1} \left[ b_k \cdot C_0\left(t-kT_c-\frac{T_c}{2}\right) + a_k b_{k-1} a_{k-1} \cdot C_1(t-kT_c)\right],$$

where A denotes the coefficient of normalization of the signal, $a_k$ denotes the spreading or spread spectrum code of the PN sequences on the in-phase channel I, and $b_k$ denotes the spreading or spread spectrum code PN sequences on the quadrature channel Q. $T_c$ is the chip period and $N_c$ the length of the PN sequence, i.e. the number of spread spectrum chips of the PN sequence of the spread spectrum code used for spreading the symbols to be transmitted, particularly the data symbols of the data channel. $C_0$ and $C_1$ are GMSK (Gaussian) filters, typical plots of their filter characteristics for the different BT values $BT_c=0.5$ (FIG. 1A), $BT_c=0.3$ (FIG. 1B) and $BT_c=0.25$ (FIG. 1C) are presented in FIG. 1A-1C.

Figure 2:
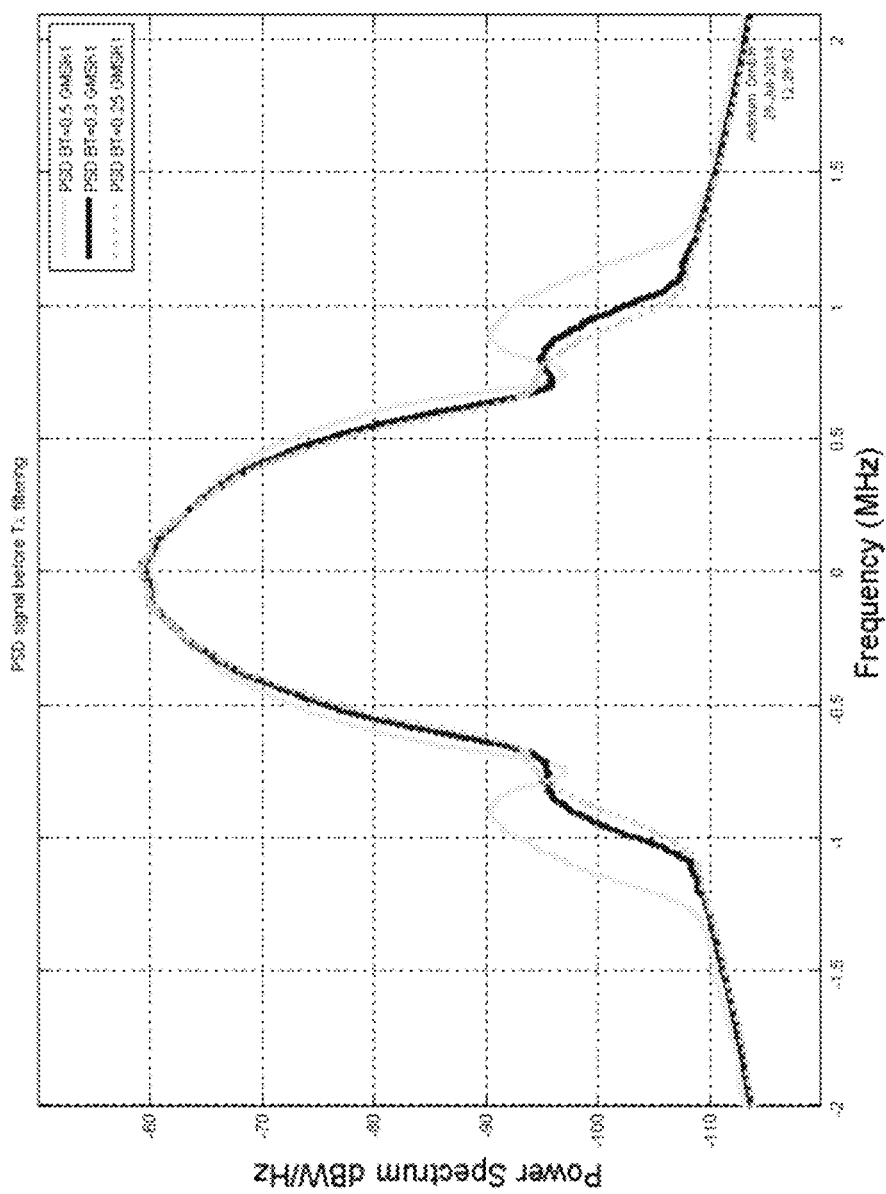
FIG. 2 shows a plot of the PSD of a GMSK CDMA signal GMSK1 for different BT values BT=0.5, BT=0.3 and BT=0.25.

FIG. 2 shows the PSD (Power Spectrum Density) of the GMSK CDMA signal GMSK1, which has only one secondary lobe very attenuated, compared to the main lobe. The PSD is shown in FIG. 2 for the three different BT values BT=0.5, BT=0.3 and BT=0.25

Figure 1B:
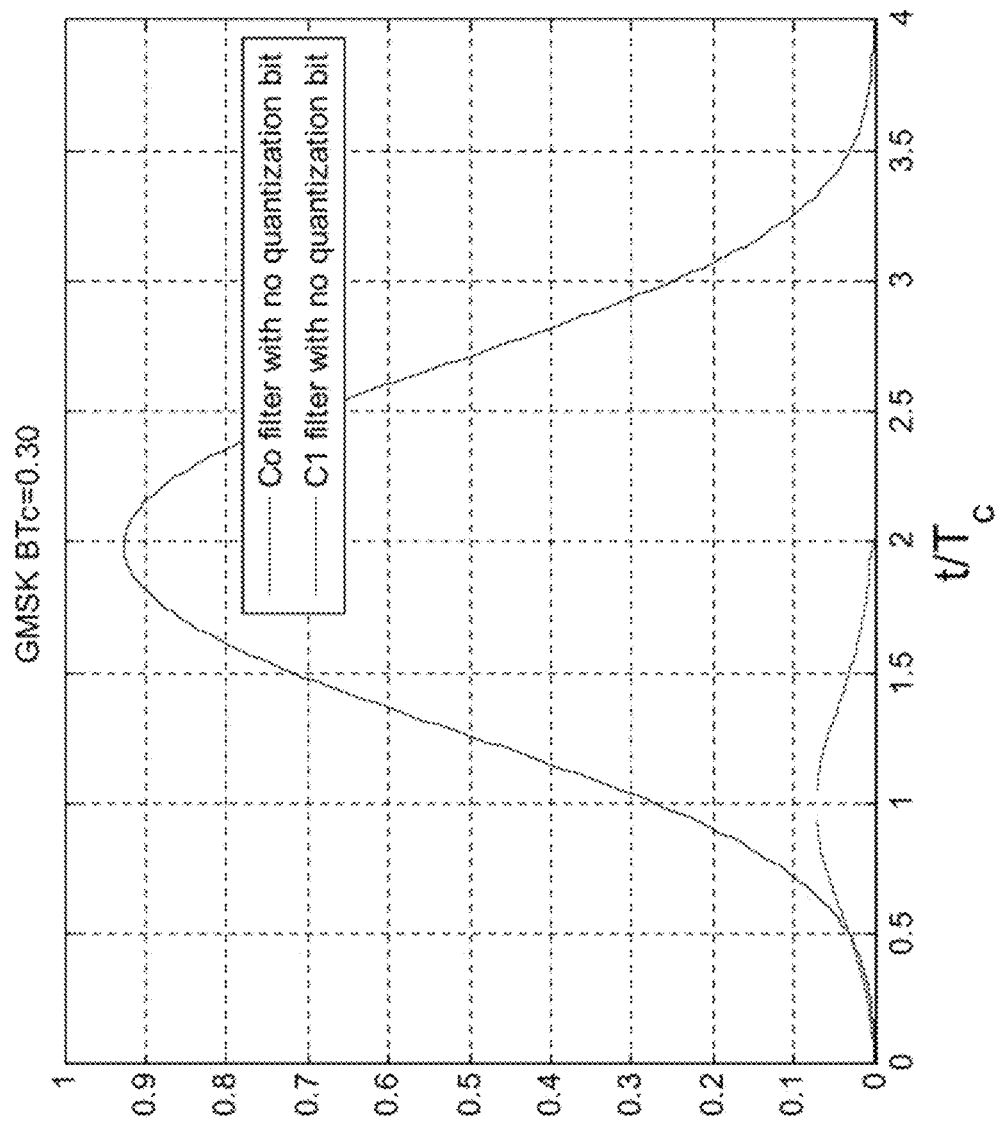
Figure 3:
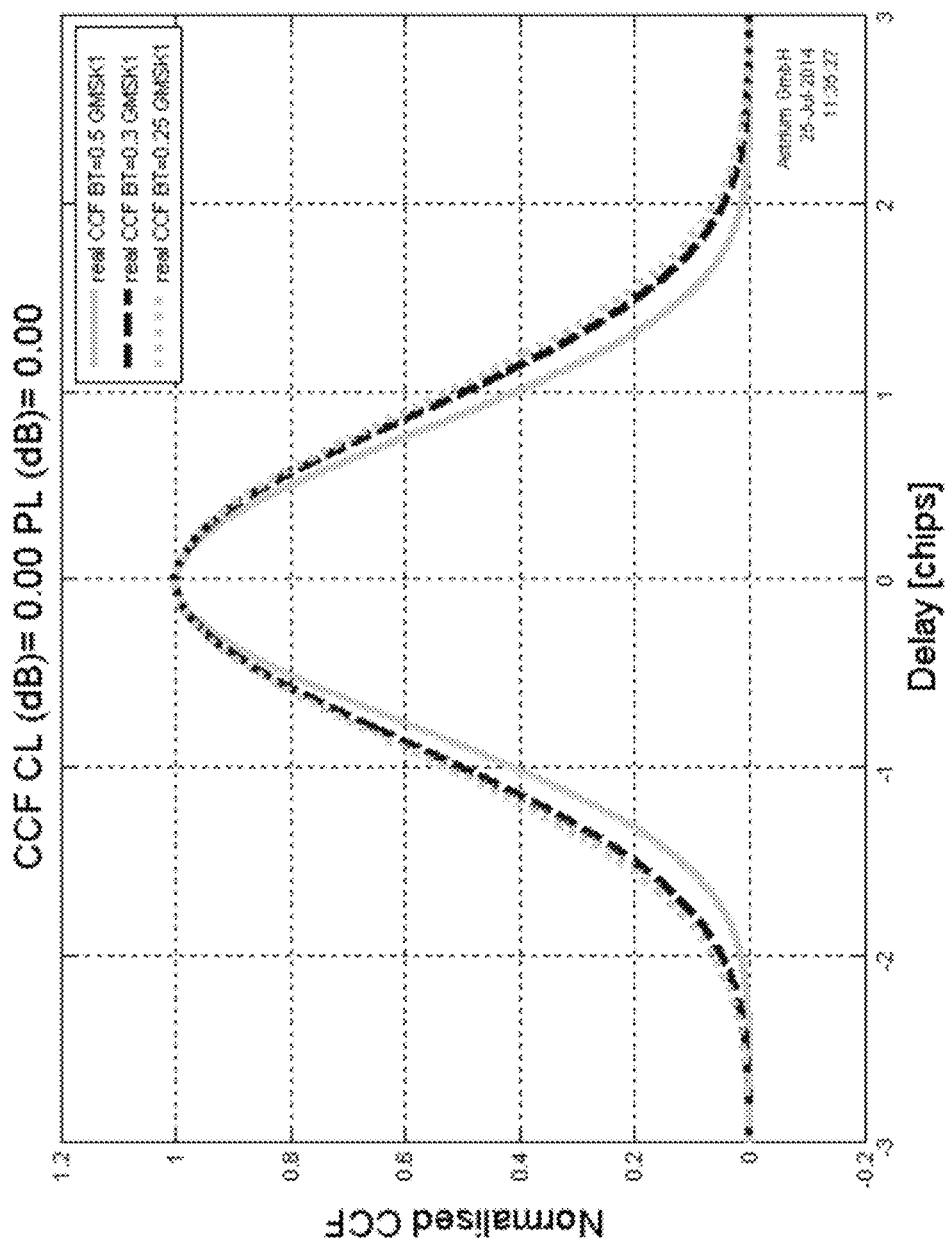
FIG. 3 shows a plot of the CCF of a GMSK CDMA signal GMSK1 for different BT values BT=0.5, BT=0.3 and BT=0.25.

As shown in FIGS. 1A-1C, the Co filter is larger than the duration of the chip introducing ICI. This means that the CCF is not anymore limited between ±1 chip as for the legacy signal modulation. This is illustrated in FIG. 3, which shows a plot of the CCF of the GMSK CDMA signal GMSK1 for the different BT values BT=0.5, BT=0.3 and BT=0.25. It can also be observed that the larger is the filter (lower BT) the higher are the CCF values outside ±1 chip.

Figure 4:
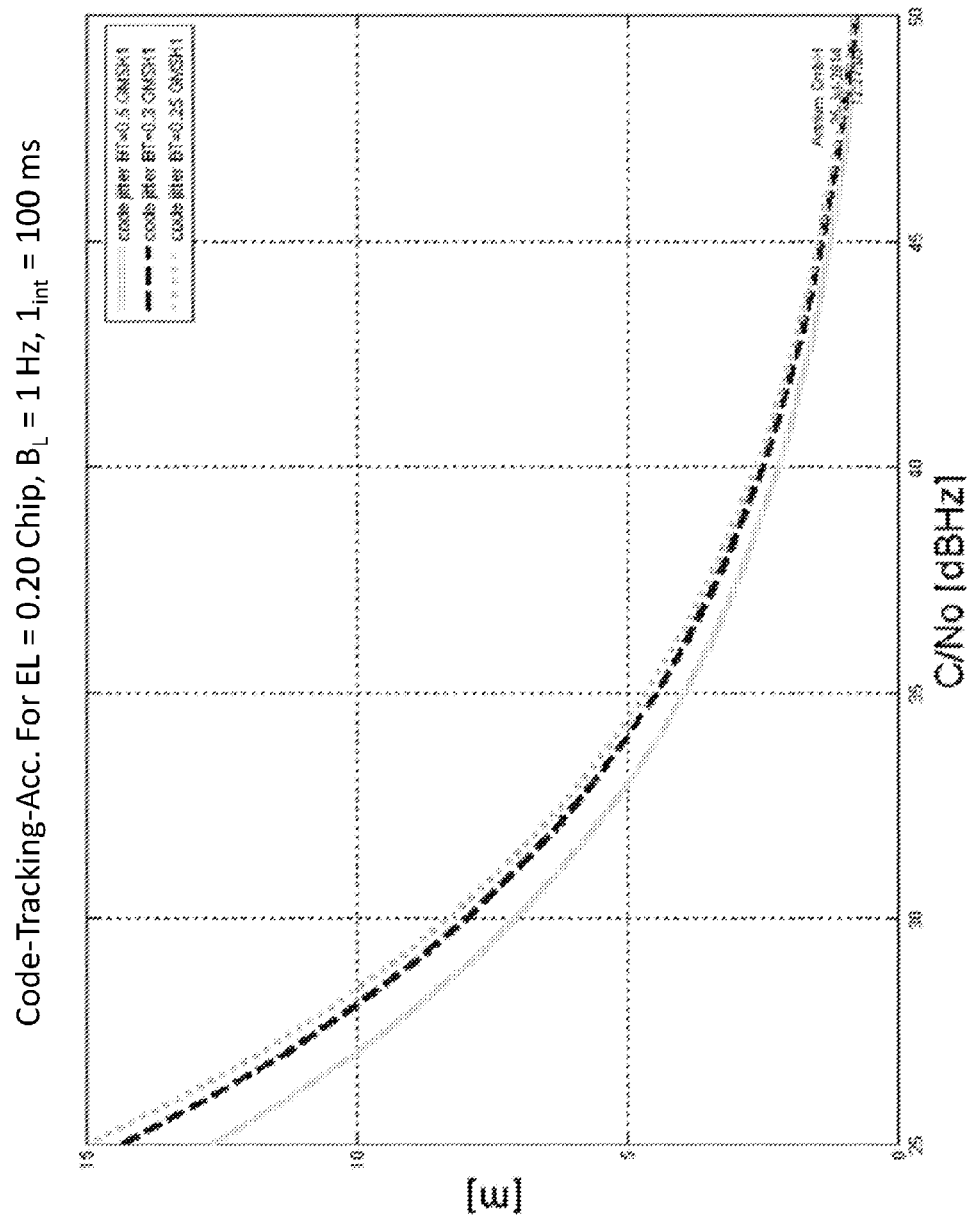
FIG. 4 shows a plot of the Code jitter of a GMSK CDMA signal GMSK1 for different BT values BT=0.5, BT=0.3 and BT=0.25.
Figure 5:
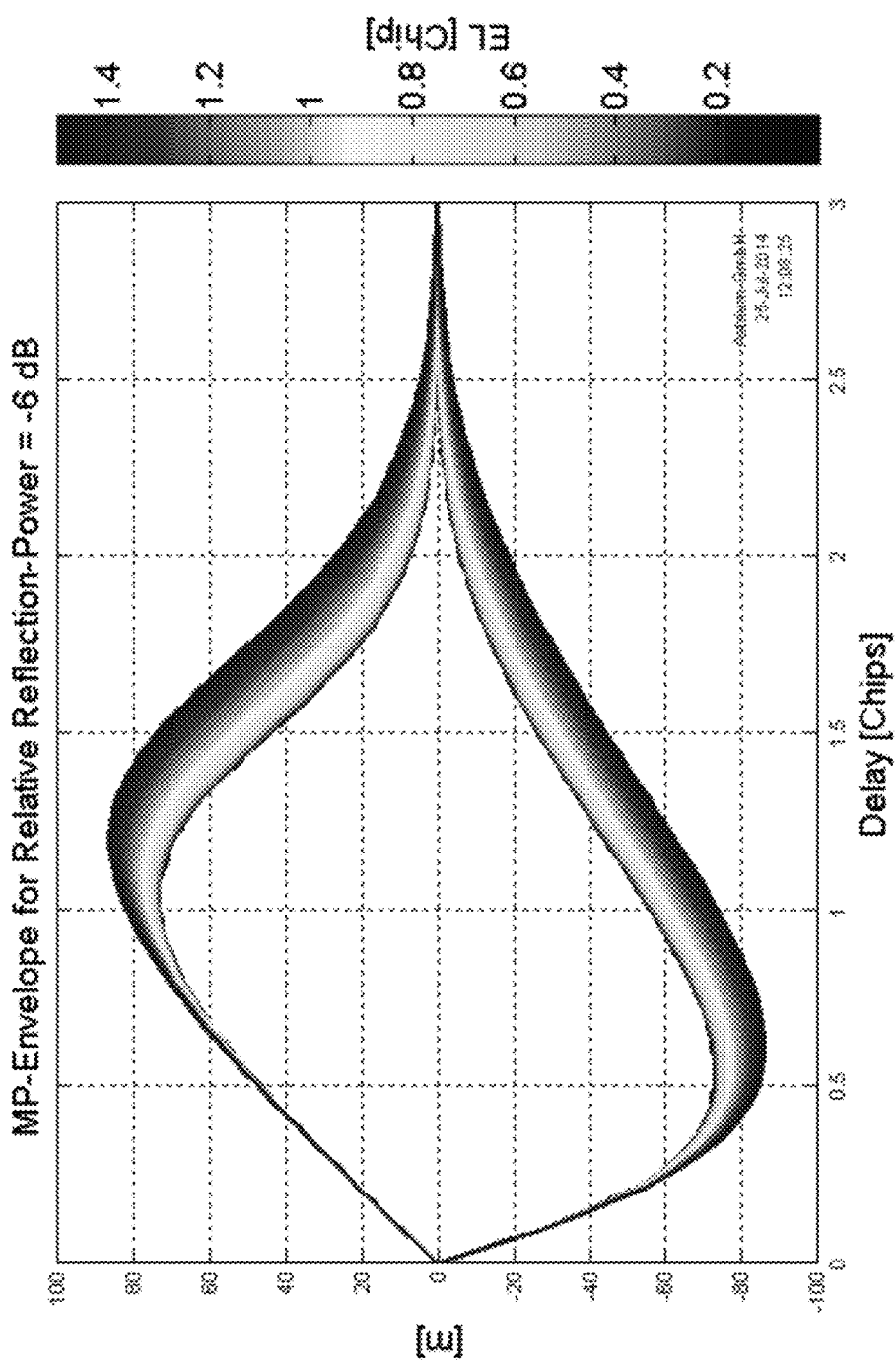
FIG. 5 shows a plot of the MP envelope for BT=0.5.
Figure 6:
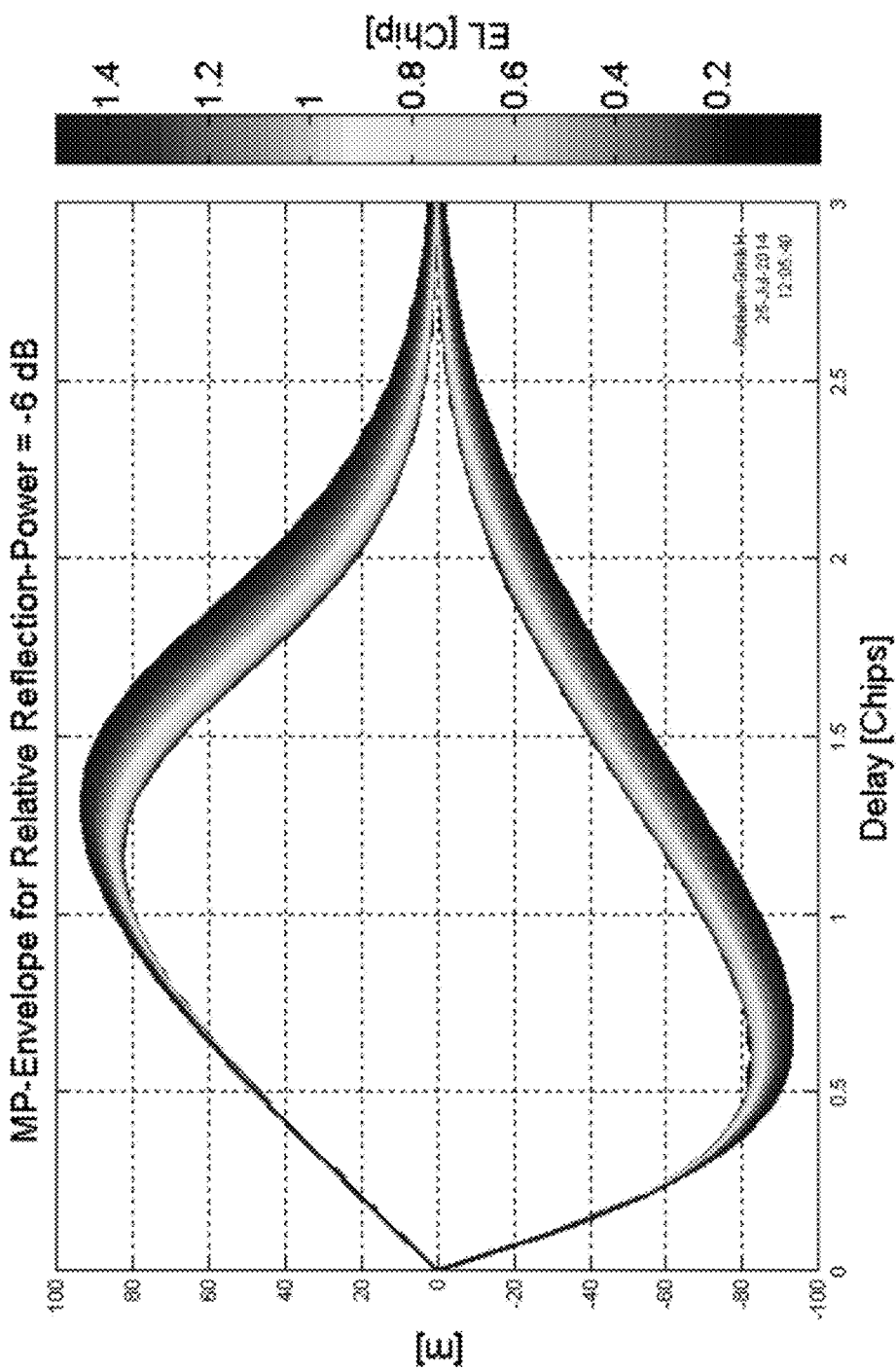
FIG. 6 shows a plot of the MP envelope for BT=0.3.
Figure 7:
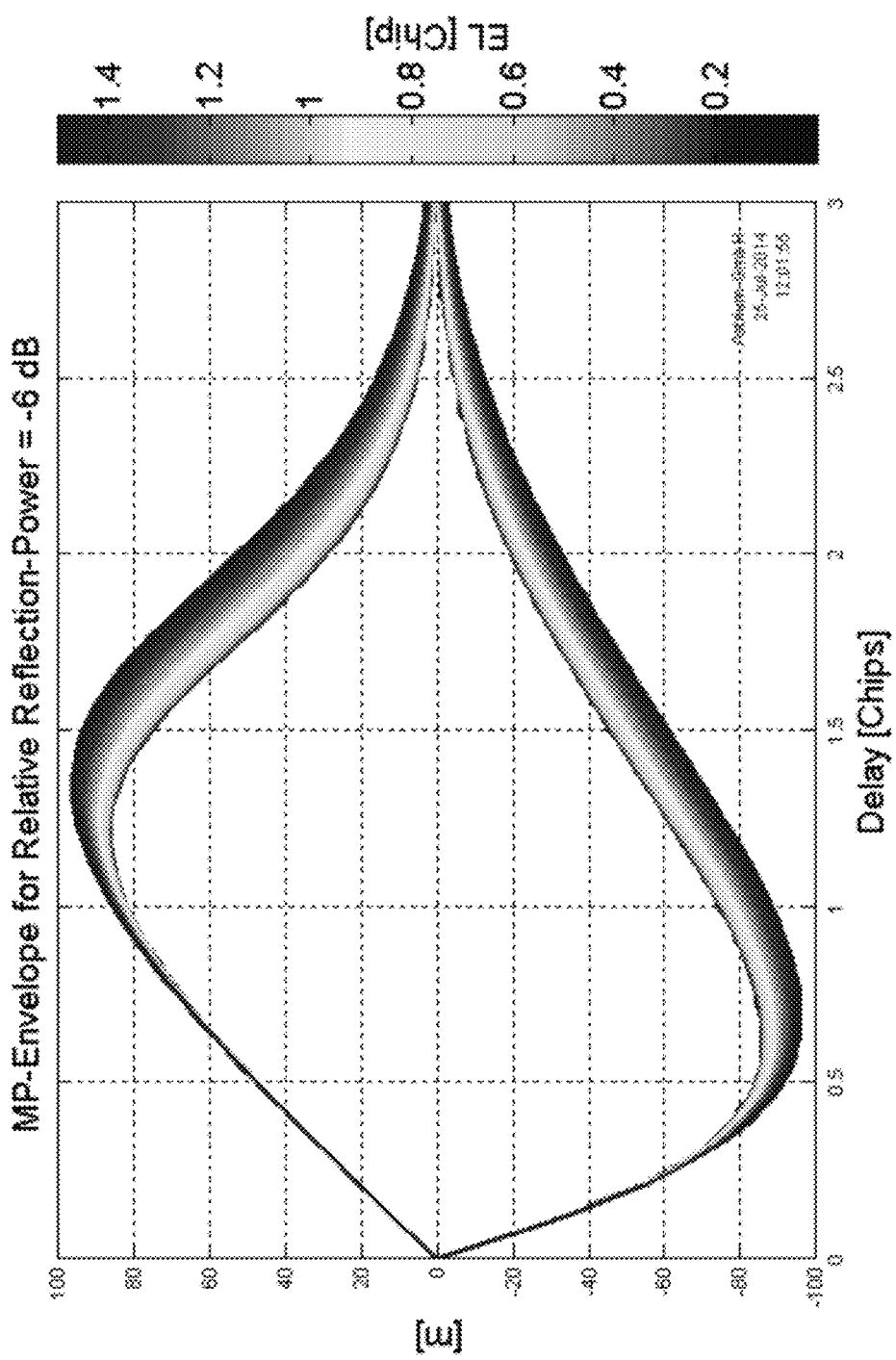
FIG. 7 shows a plot of the MP envelope for BT=0.25.

The tracking performances of such GMSK CDMA signals are therefore degraded compared to a BPSK modulated signal with the same chipping rate. The CCF peak is not as sharp as the BPSK CCF peak, which causes a degradation of the tracking performance in an AWGN (Additive White Gaussian Noise) and multipath environment, as it can be seen by the plot of the Code jitter of the GMSK CDMA signal GMSK1 for different BT values BT=0.5, BT=0.3 and BT=0.25 of FIG. 4. In addition, as the CCF is not limited to ±1 chip, long distance multipath (more than 1.5 chip) degrade the code tracking as shown by the plots of the MP (Multipath) envelope for different BT values BT=0.5, BT=0.3 and BT=0.25 of FIGS. 5, 6 and 7, respectively.

Figure 8:
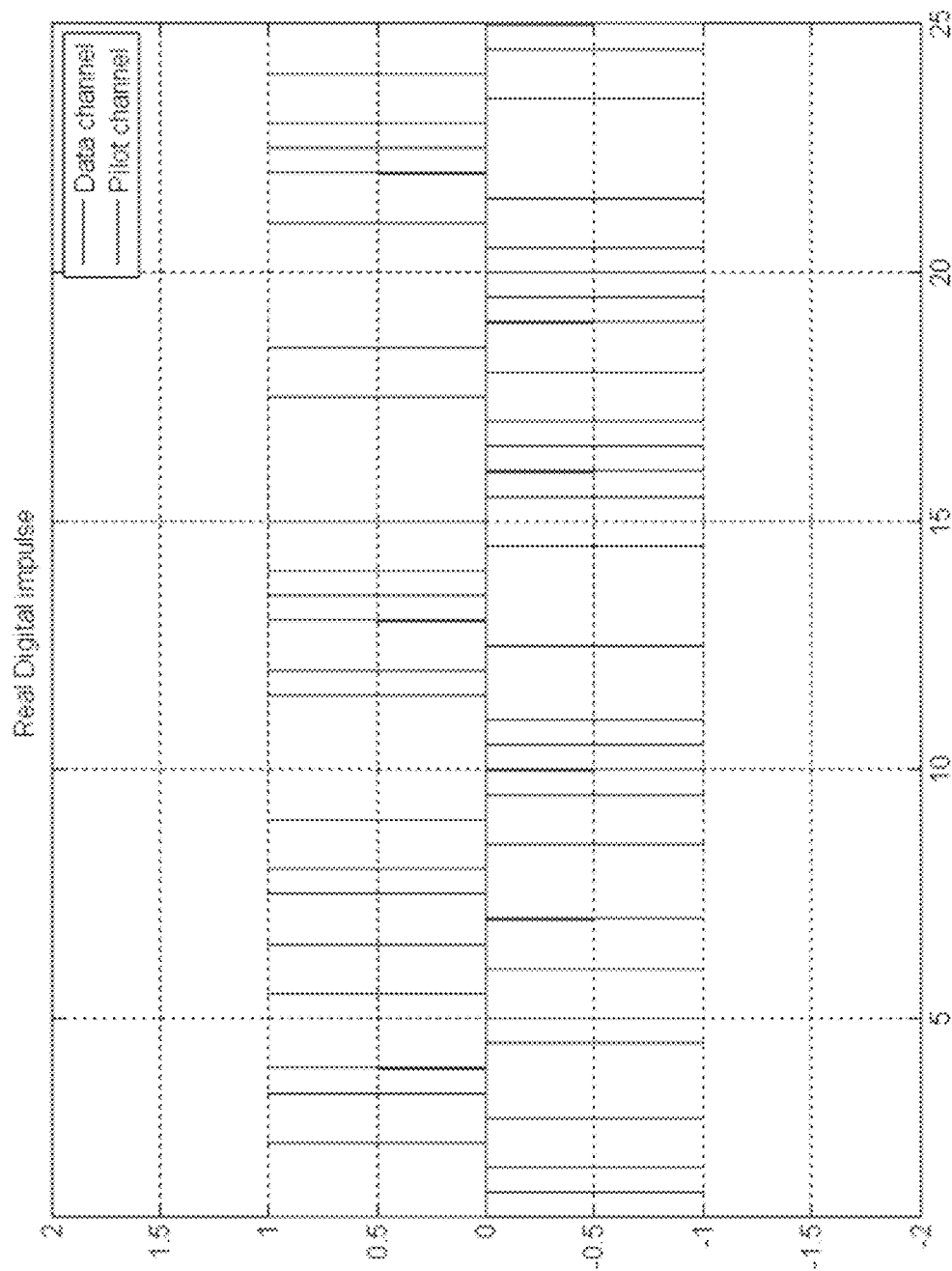
FIG. 8 shows an example sequence of the Pilot channel on I and the Data channel on Q of a GMSK CDMA signal of a GNSS.

The main drawback of the GMSK is that due to ICI, the CCF is not very efficient as shown previously. The present invention proposes to modify the transmitted sequence of CDMA codes for improving the CCF. For GMSK CDMA signals, two spread spectrum codes each comprising a sequence of spread spectrum chips are used, one code for the in-phase (I) channel and the other one for the quadrature (Q) channel. FIG. 8 shows an example of a sequence of the Pilot channel on I and the Data channel on Q.

Figure 9:
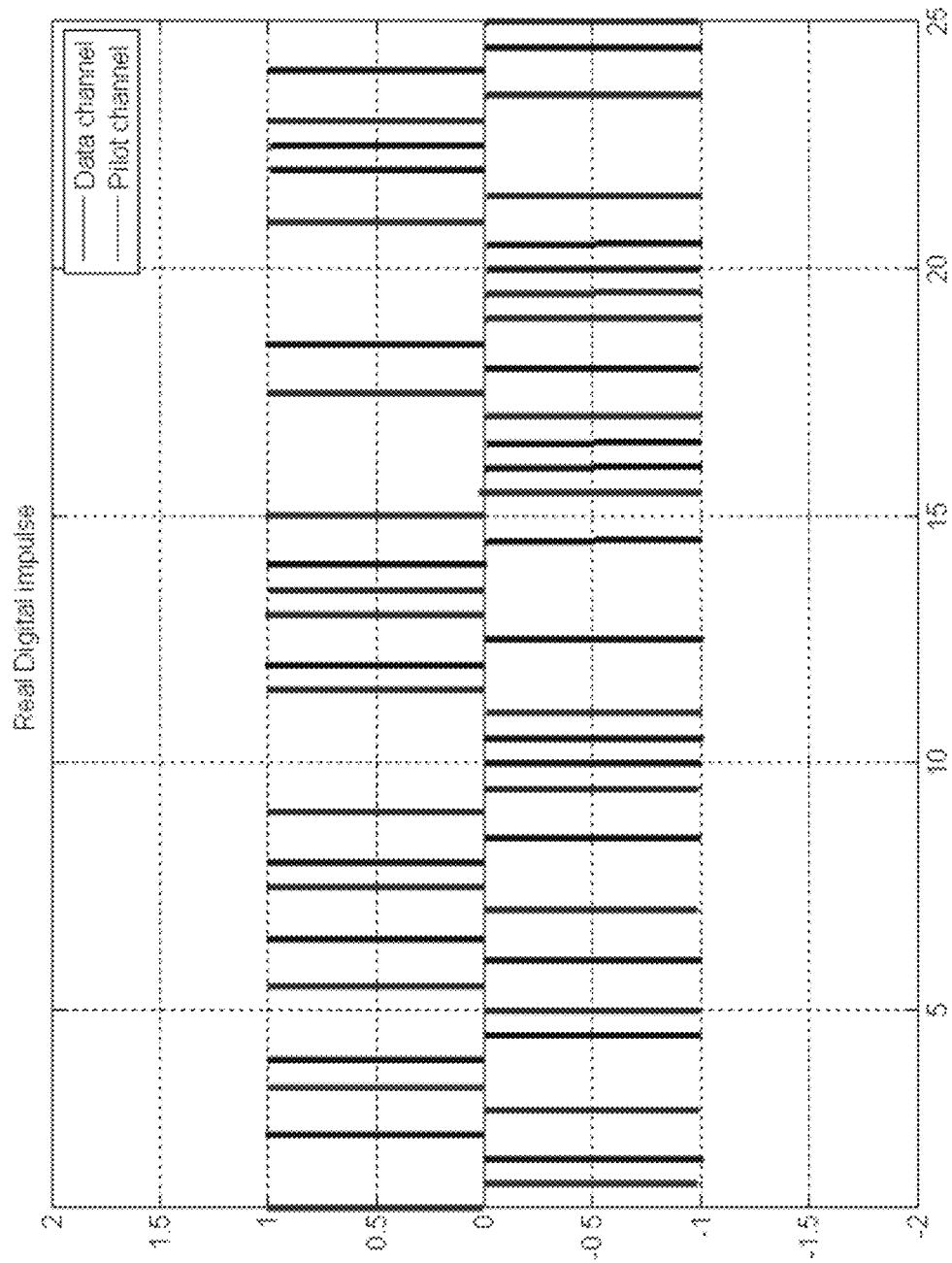
FIG. 9 shows an example sequence of the Pilot channel on I and the Data channel on Q of a GMSK CDMA signal of a GNSS according to the invention.

To avoid the ICI, the pilot and data channel are transmitted on both I and Q channels. Not more than two consecutive code chips from the pilot or data channel will be transmitted on the same channel (I or Q). The ICI will be cancelled through the isolation of the data and pilot spreading codes. An example a sequence of the data and pilot code spreading sequences is shown in FIG. 9.

Figure 10:
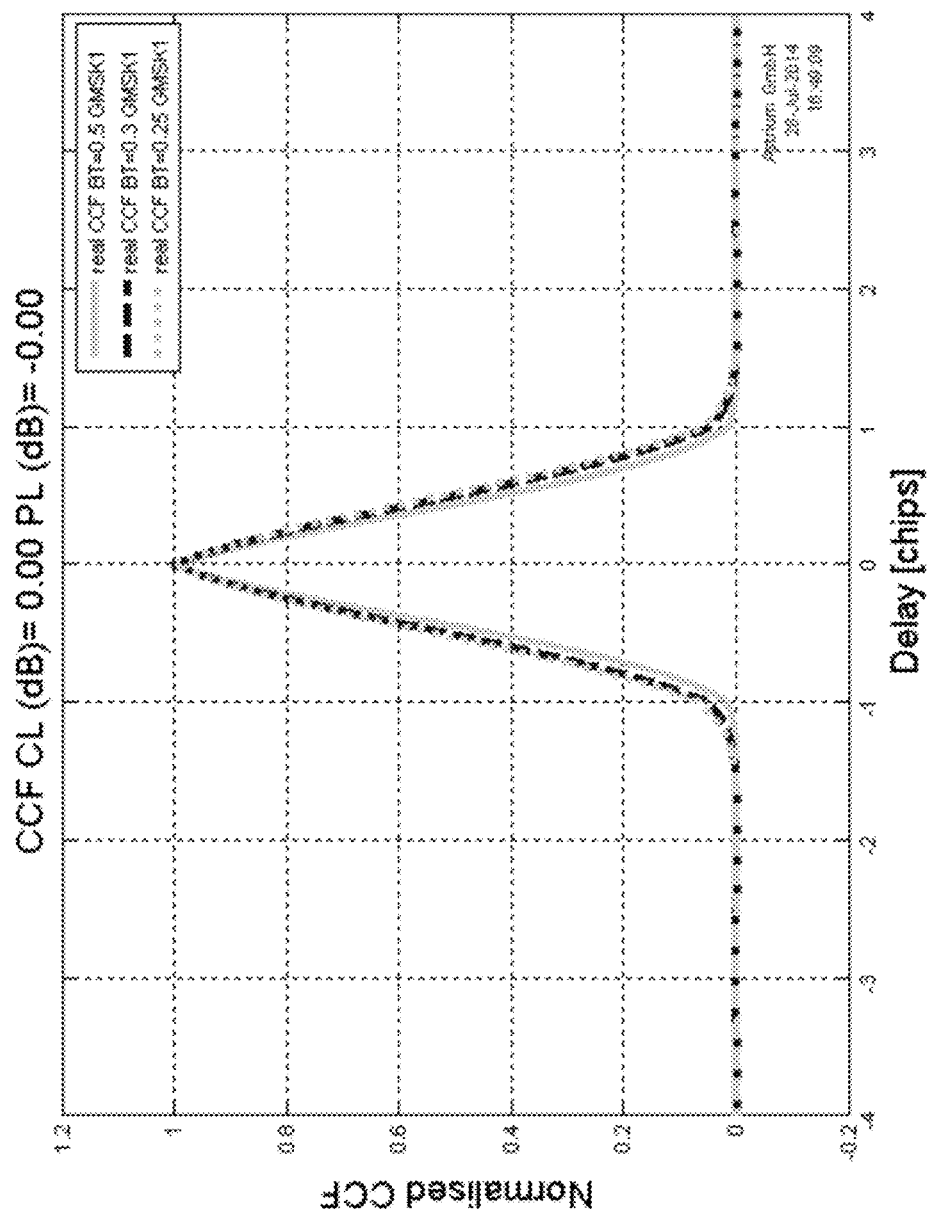
FIG. 10 shows a plot of the GMSK CCF GMSK1 for BT=0.5, BT=0.3 and BT=0.25 of a GMSK CDMA signal according to the invention.
Figure 11:
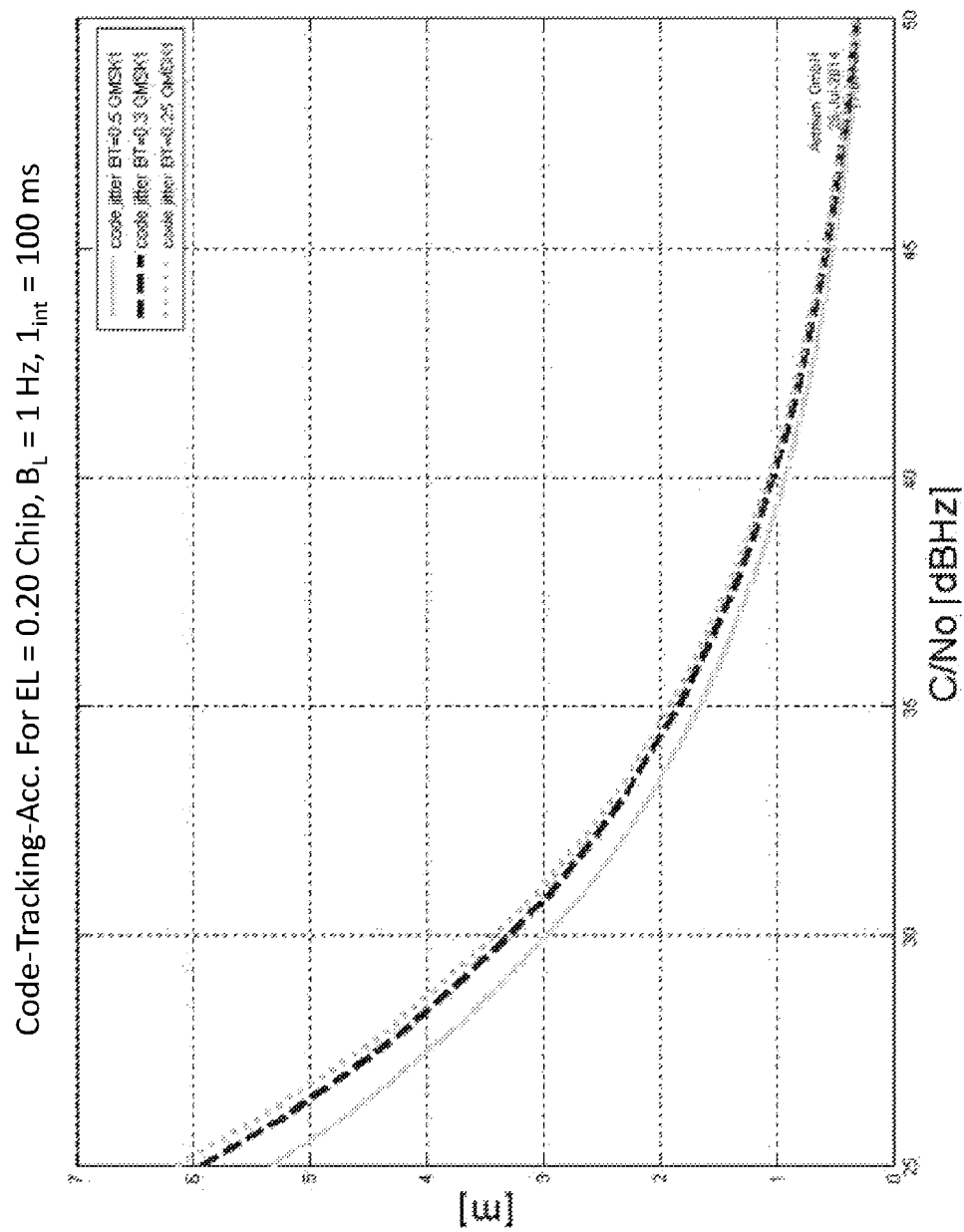
FIG. 11 shows a plot of the GMSK Code jitter GMSK1 BT=0.5 BT=0.3 and BT=0.25 of a GMSK CDMA signal according to the invention.
Figure 12:
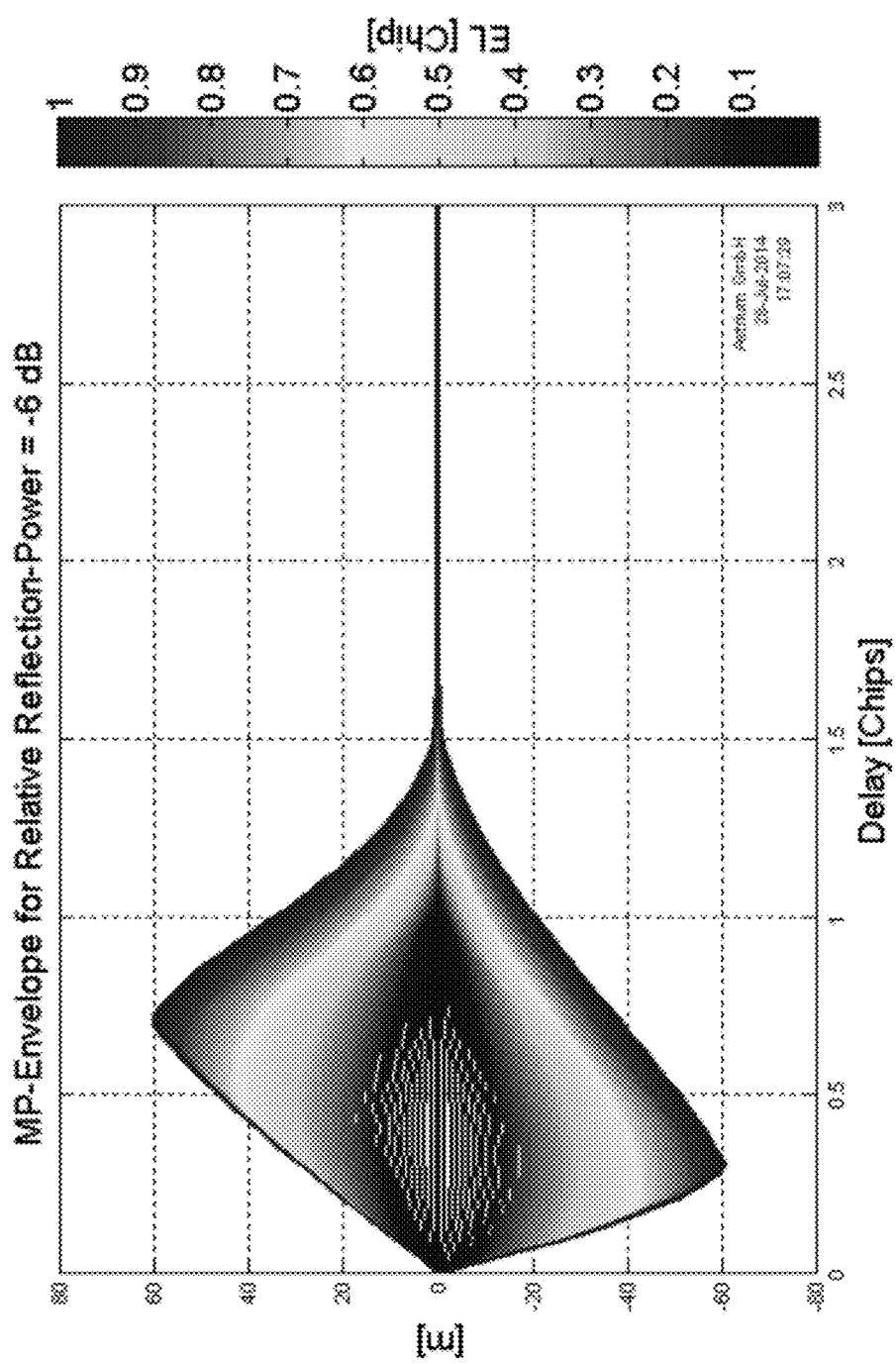
FIG. 12 shows a plot of the MP envelope for BT=0.5 of a GMSK CDMA signal according to the invention.
Figure 13:
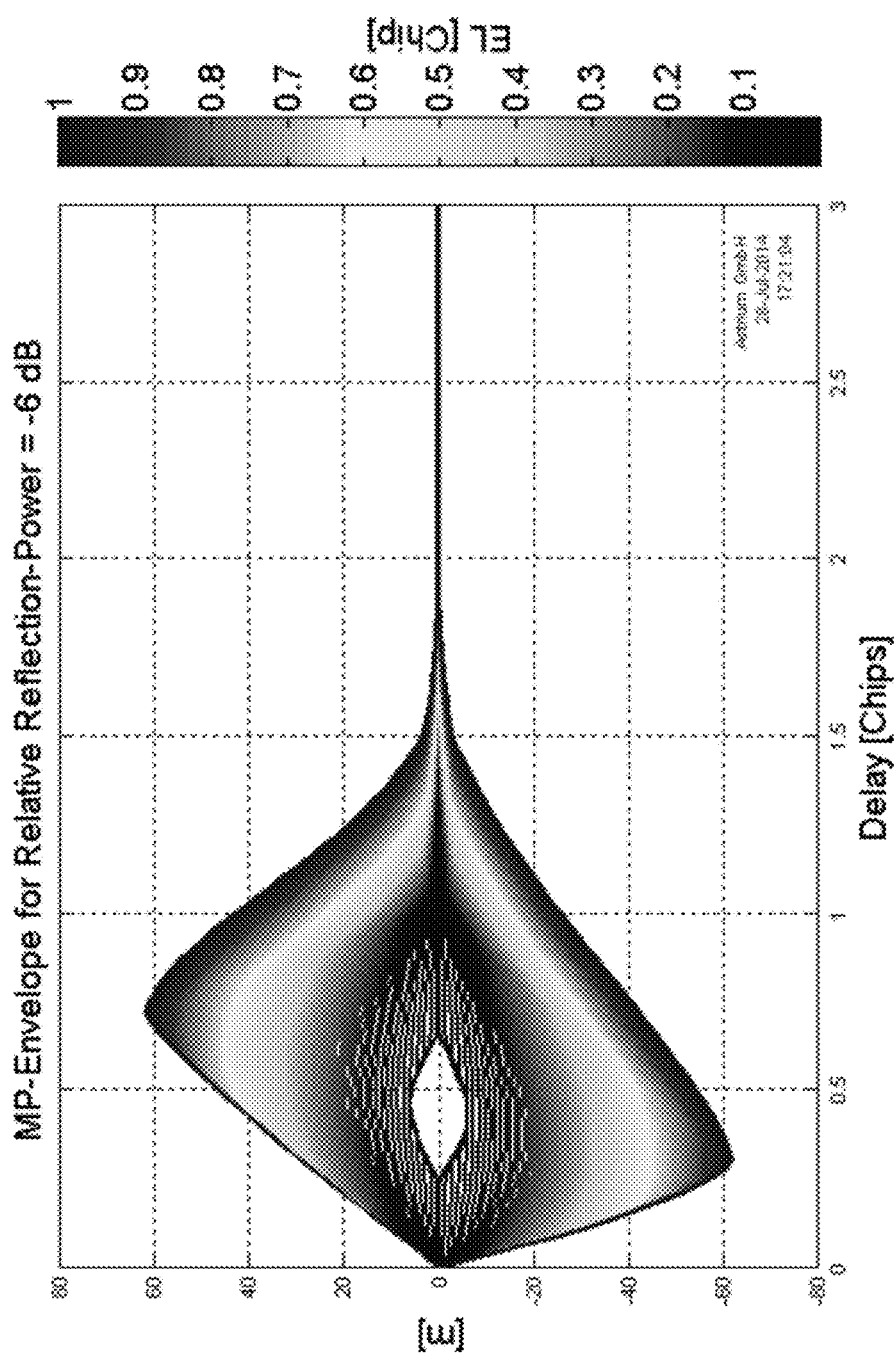
FIG. 13 shows a plot of the MP envelope for BT=0.3 of a GMSK CDMA signal according to the invention.
Figure 14:
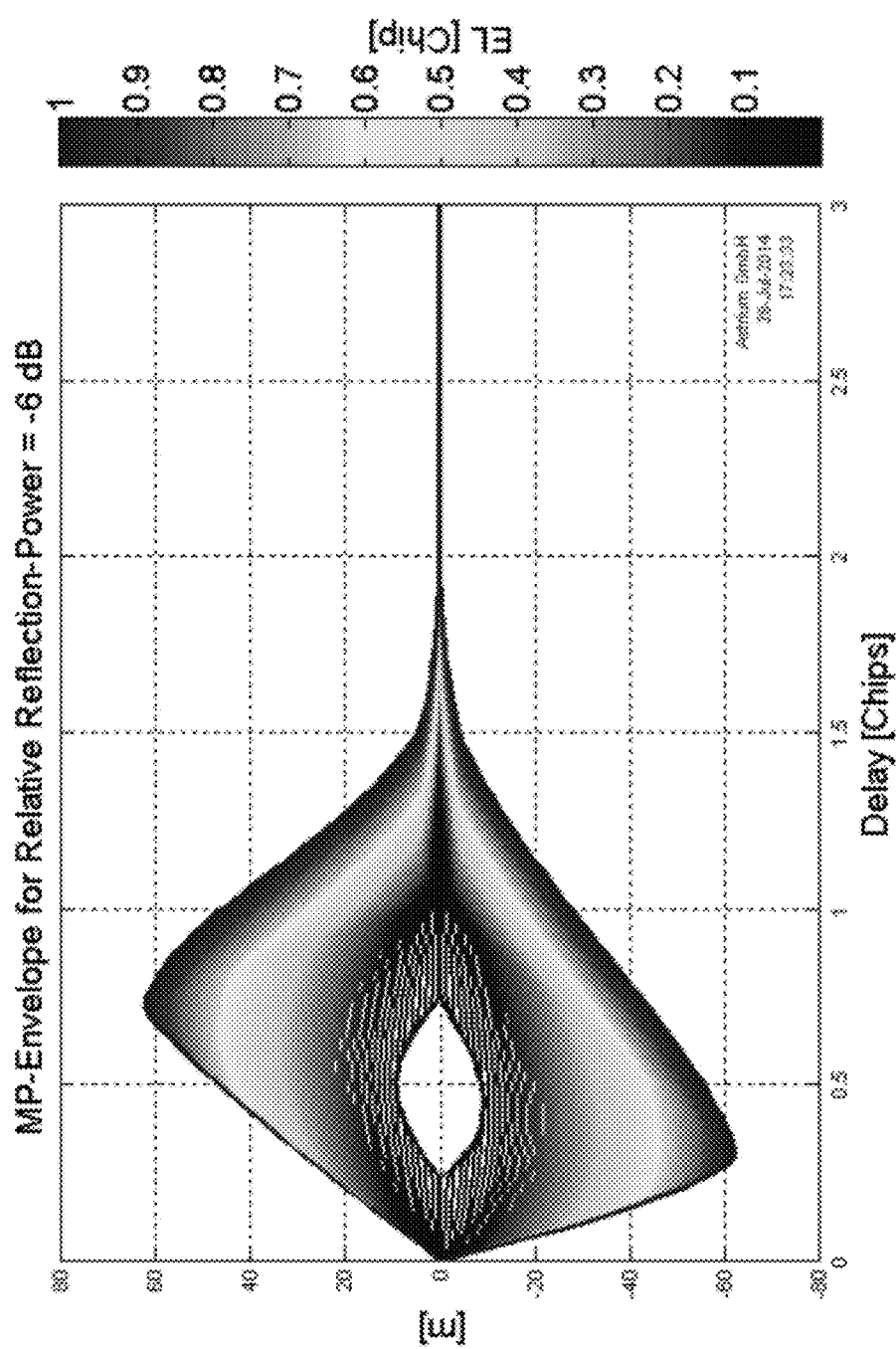
FIG. 14 shows a plot of the MP envelope for BT=0.25 of a GMSK CDMA signal according to the invention.

In the following, the CCF is evaluated considering this new technique. The CCF is shown in FIG. 10 for different BT values BT=0.5, BT=0.3 and BT=0.25. Compared with the CCF shown in FIG. 3, the CCF peak is sharper and nearly limited to ±1 chip. Code tracking jitter in an AWGN and MP envelope for different BT values BT=0.5, BT=0.3 and BT=0.25 are shown in FIGS. 11, 12, 13, and 14, respectively. All the plots shown in FIG. 11-14 have been done without considering any bandwidth filtering or distortions.

Another way to suppress the ICI, is to transmit two spreading codes per channel (I & Q). The principle is still the same; not more than two, particularly two consecutive chips of the same code will be transmitted on the same channel (I or Q). In this case, the two spreading codes on the I channel and the two spreading codes on the Q channel are interleaved in order to avoid that two consecutive chips of the same spreading code are transmitted on the same channel. The technique can be extended to n spreading codes on the I channel and m spreading codes on the Q channel.

Figure 15:
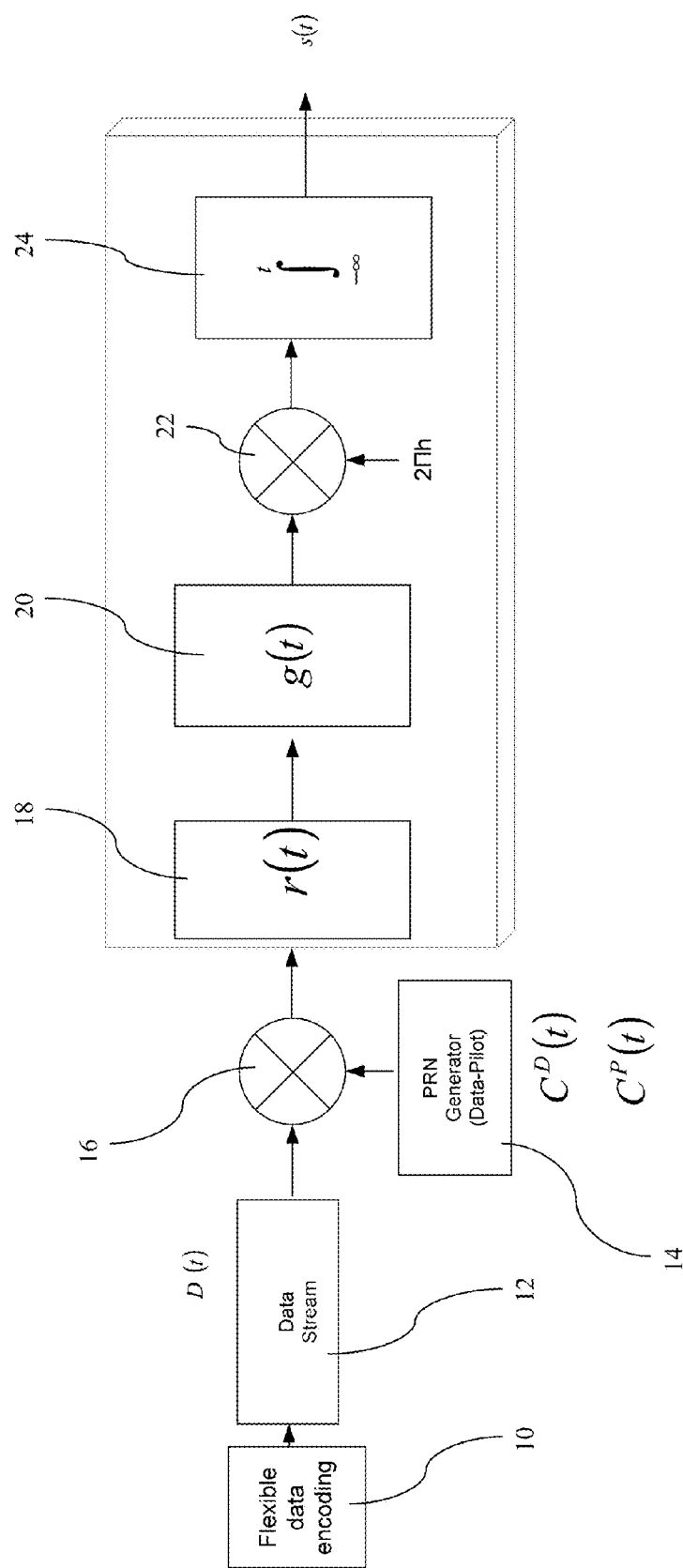
FIG. 15 shows a block diagram of a GMSK CDMA signal transmitter in accordance with an embodiment of the invention.

FIG. 15 shows a block diagram of a transmitter for generating and transmitting a GMSK CDMA signal according to the invention.

The data to be transmitted are flexibly encoded by an encoder 10 and supplied to a data stream generator 12 for generating a data stream D(t) consisting of a sequence of data symbols for the data channel.

A PRN (Pseudo-Random Noise) generator 14 for the data and pilot channel generates at least one first spectrum code comprising a sequence $C^D(t)$ of spread spectrum chips for the data channel and at least one second spectrum code comprising a sequence $C^P(t)$ of spread spectrum chips for the pilot channel.

A combiner 16 combines the data stream D(t) with the sequence of data symbols for the data channel with the spread spectrum chips of the first sequence $C^D(t)$ and data symbols for the pilot channel with the spread spectrum chips of the second sequence $C^P(t)$ and outputs the generated sequence of chips.

A pre-modulation chip sequence generator 18 receives the sequence of chips generated and output by the combiner 16 and generates a sequence r(t) of pre-modulation chips by assigning chips belonging to the data channel and the pilot channel to the transmission channels In-Phase I and Quadrature Q of the spread spectrum GMSK signal such that not more than two consecutive pre-modulation chips generated with the same spread spectrum code are transmitted in the same transmission channel I or Q.

The generator 18 can perform different assignment strategies:

1. Pre-modulation chips generated with the first spread spectrum code can be assigned to the transmission channels In-Phase I and Quadrature Q of the spread spectrum GMSK signal so that two consecutive pre-modulation chips generated with the first spread spectrum code are transmitted in different transmission channels I or Q, and pre-modulation chips generated with the second spread spectrum code can assigned to the transmission channels In-Phase I and Quadrature Q of the spread spectrum GMSK signal so that two consecutive pre-modulation chips generated with the second spread spectrum code are transmitted in different transmission channels I or Q. Thus, consecutive pre-modulation chips generated with the first or second spread spectrum code are distributed among the different transmission channels I and Q so that the first and second spread spectrum codes are isolated and ICI is reduced or even cancelled.

2. Another strategy is to obtain two or more first spread spectrum codes and two or more second spread spectrum codes. Thus, the data symbols of the data channel and the pilot channel are spreaded with several spread spectrum codes. In order to reduce ICI, the pre-modulation chips generated with the first spread spectrum codes are assigned to the transmission channel In-Phase I of the spread spectrum GMSK signal by interleaving the pre-modulation chips so that not more than two consecutive pre-modulation chips generated with the same one of the first spread spectrum codes are transmitted in the transmission channel I, and pre-modulation chips generated with the second spread spectrum codes are assigned to the transmission channel Quadrature Q of the spread spectrum GMSK signal by interleaving the pre-modulation chips so that not more than two consecutive pre-modulation chips generated with the same one of the second spread spectrum codes are transmitted in the transmission channel Q. Thus, consecutive pre-modulation chips generated with the first or second spread spectrum code are distributed within the different transmission channels I and Q so that the first and second spread spectrum codes are isolated and ICI is reduced or even cancelled.

The sequence r(t) generated by the generator 18 is then filtered by a Gaussian low pass filter 22, for example with filter characteristics as shown in FIGS. 1A-1C, for generating an filtered sequence g(t).

A quadrature or I-Q modulator 22 modulates the filtered sequence g(t) by using the chips assigned to the In-Phase I transmission channel to generate an In-Phase signal and the chips assigned to the Quadrature Q transmission channel to generate a Quadrature signal. The generated In-Phase signal and Quadrature signal are summed and output by the modulator 22.

An integrator 24 integrates the sum of the In-Phase and Quadrature signals and outputs the baseband out signal s(t).

Figure 16:
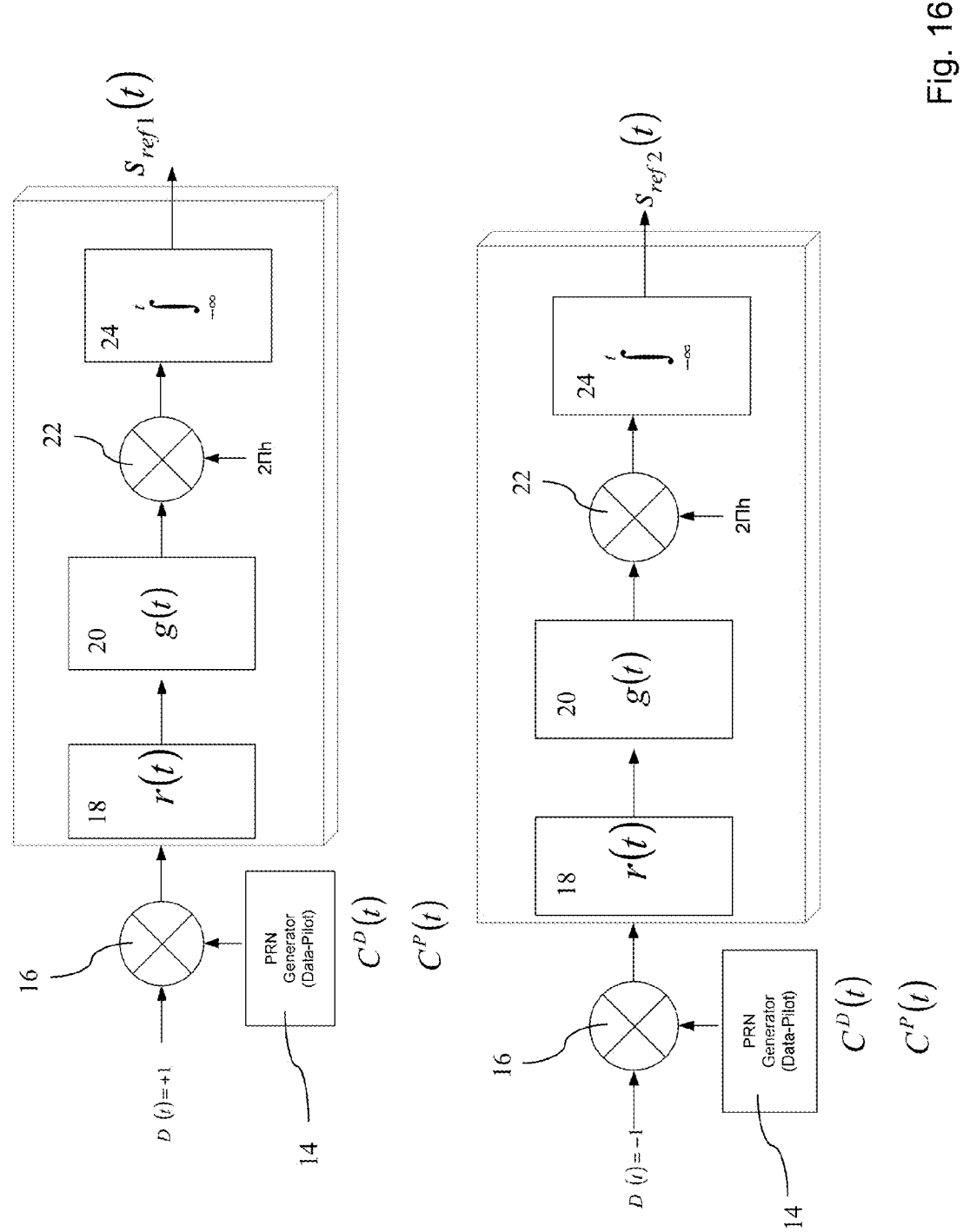
FIG. 16 shows a block diagram of a GMSK CDMA signal receiver in accordance with an embodiment of the invention.

FIG. 16 shows a block diagram of a receiver for the GMSK CDMA signal. The receiver in principle uses the same elements as the transmitter. However, for each integration time, the receiver has to consider two reference signals $s_{ref1}(t)$ and $s_{ref2}(t)$, one considering that +1 or −1 has been transmitted on the data channel.

The receiver uses a similar architecture as the transmitter for generating the reference signals $s_{ref1}(t)$ and $s_{ref1}(t)$, as shown in FIG. 16.

Once the two reference signals are generated, two correlation functions are simultaneously evaluated between the input baseband signal D(t) and the reference signal $s_{ref1}(t)$ and input baseband signal D(t) and the reference signal $sr_{ef2}(t)$. The highest value of the punctual correlator will decide which reference signal to consider for the corresponding integration time.

The present invention allows increasing the signal performance of code tracking of a spread spectrum GMSK signal transmitted in an AWGN and multipath environment by reducing ICI through transmitting pre-modulation chips of a pilot and a data channel on both I and Q transmission channels and providing that not more than two consecutive pre-modulation chips generated with the same spread spectrum code are transmitted in the same transmission channel I or Q.

In the following, a simple, low cost architecture for a receiver is briefly described.

Another way to receive the transmitted signal described herein is to design the receiver architecture based on the simplification of the Laurent decomposition equation and generate the reference signal considering the following equation:

$$S_{ref}(t) = A \left( \sum_{k=0}^{\frac{N_c-2}{2}} [a_{2k} \cdot C_0(t - 2kT_c) + b_{2k} \cdot C_0(t - (2k+1)T_c)] \right) +$$

$$jA \sum_{k=0}^{\frac{N_c-2}{2}} \left[ a_{2k+1} \cdot C_0\left(t - 2kT_c - \frac{T_c}{2}\right) + b_{2k+1} \cdot C_0\left(t - (2k+1)T_c - \frac{T_c}{2}\right) \right],$$

where A denotes the coefficient of normalization of the signal, $a_k$ denotes the pilot spreading or spread spectrum code of the PN sequences, and $b_k$ denotes the data spreading or spread spectrum code PN sequences. $T_c$ is the chip period and $N_c$ the length of the PN sequence, i.e. the number of spread spectrum chips of the PN sequence of the spread spectrum code used for spreading the symbols to be transmitted, particularly the data symbols of the data channel. $C_0$ is a GMSK (Gaussian) filter.

If only the pilot channel should be tracked, just the data spreading code sequence must be replaced by a sequence of zeros with the same length.

If only the data channel should be tracked, just the pilot spreading code sequence must be replaced by a sequence of zeros with the same length.

Due to phase discontinuity, the low cost receiver will have lower performances than the first receiver described herein.

REFERENCE NUMERALS AND ACRONYMS 10 flexible data encoder
12 data stream generator
14 PRN generator
16 combiner
18 pre-modulation chip sequence generator
20 Gaussian low pass filter
22 quadrature modulator
24 integrator
AWGN Additive White Gaussian Noise
BPSK Binary Phase Shift Keying
CCF Cross Correlation Function
CDMA Code Division Multiple Access
DSSS Direct Sequence Spread Spectrum
FSK Frequency Shift Keying
GMSK Gaussian Minimum Shift Keying
GNSS Global Navigation Satellite System
GPS Global Positioning System
GSM Global System for Mobile Communication
ICI Inter-Chip Interference
ISI Intra-Symbol Interference
PN Pseudo-Random Noise
PSD Power Spectral Density

What is claimed is:

1. A method for generating a spread spectrum Gaussian Minimum Shift Keying (GMSK) signal comprising the acts of:
    obtaining a sequence of data symbols for a data channel;
    obtaining at least one first spread spectrum code comprising a first sequence of spread spectrum chips for the data channel;
    obtaining at least one second spread spectrum code comprising a second sequence of spread spectrum chips for a pilot channel;
    generating a sequence of pre-modulation chips by combining the sequence of data symbols for the data channel with the spread spectrum chips of the first sequence of the at least one first spread spectrum code and data symbols for the pilot channel with the spread spectrum chips of the second sequence of the at least one second spread spectrum code to a combined sequence of chips;
    assigning the chips of the combined sequence of chips to the transmission channels In-Phase I and Quadrature Q of the spread spectrum GMSK signal so that not more than two consecutive pre-modulation chips generated with the same spread spectrum code are transmitted in the same transmission channel I or Q;
    performing GMSK modulation using the sequence of pre-modulation chips to generate the spread spectrum GMSK signal;
    obtaining one first spread spectrum code and one second spread spectrum code;
    assigning pre-modulation chips generated with the first spread spectrum code to the transmission channels In-Phase I and Quadrature Q of the spread spectrum GMSK signal so that two consecutive pre-modulation chips generated with the first spread spectrum code are transmitted in different transmission channels I or Q; and
    assigning pre-modulation chips generated with the second spread spectrum code to the transmission channels In-Phase I and Quadrature Q of the spread spectrum GMSK signal so that two consecutive pre-modulation chips generated with the second spread spectrum code are transmitted in different transmission channels I or Q.

2. A method for generating a spread spectrum Gaussian Minimum Shift Keying (GMSK) signal comprising the acts of:
    obtaining a sequence of data symbols for a data channel;
    obtaining at least one first spread spectrum code comprising a first sequence of spread spectrum chips for the data channel;
    obtaining at least one second spread spectrum code comprising a second sequence of spread spectrum chips for a pilot channel;
    generating a sequence of pre-modulation chips by combining the sequence of data symbols for the data channel with the spread spectrum chips of the first sequence of the at least one first spread spectrum code and data symbols for the pilot channel with the spread spectrum chips of the second sequence of the at least one second spread spectrum code to a combined sequence of chips;

assigning the chips of the combined sequence of chips to the transmission channels In-Phase I and Quadrature Q of the spread spectrum GMSK signal so that not more than two consecutive pre-modulation chips generated with the same spread spectrum code are transmitted in the same transmission channel I or Q;

performing GMSK modulation using the sequence of pre-modulation chips to generate the spread spectrum GMSK signal;

obtaining two or more first spread spectrum codes and two or more second spread spectrum codes;

assigning pre-modulation chips generated with the first spread spectrum codes to the transmission channel In-Phase I of the spread spectrum GMSK signal by interleaving the pre-modulation chips so that not more than two consecutive pre-modulation chips generated with the same one of the first spread spectrum codes are transmitted in the transmission channel I; and assigning pre-modulation chips generated with the second spread spectrum codes to the transmission channel Quadrature Q of the spread spectrum GMSK signal by interleaving the pre-modulation chips so that not more than two consecutive pre-modulation chips generated with the same one of the second spread spectrum codes are transmitted in the transmission channel Q.

3. A method for receiving a spread spectrum Gaussian Minimum Shift Keying (GMSK) signal that was generated according to the acts of:

obtaining a sequence of data symbols for a data channel;

obtaining at least one first spread spectrum code comprising a first sequence of spread spectrum chips for the data channel;

obtaining at least one second spread spectrum code comprising a second sequence of spread spectrum chips for a pilot channel;

generating a sequence of pre-modulation chips by combining the sequence of data symbols for the data channel with the spread spectrum chips of the first sequence of the at least one first spread spectrum code and data symbols for the pilot channel with the spread spectrum chips of the second sequence of the at least one second spread spectrum code to a combined sequence of chips;

assigning the chips of the combined sequence of chips to the transmission channels In-Phase I and Quadrature Q of the spread spectrum GMSK signal so that not more than two consecutive pre-modulation chips generated with the same spread spectrum code are transmitted in the same transmission channel I or Q; and performing GMSK modulation using the sequence of pre-modulation chips to generate the spread spectrum GMSK signal, wherein the method for receiving the spread spectrum GMSK signal comprising the acts of:

generating a first reference signal considering that a first data symbol has been transmitted with the received spread spectrum GMSK signal;

generating a second reference signal considering that a second data symbol has been transmitted with the received spread spectrum GMSK signal;

simultaneously evaluating a first correlation function of the received spread spectrum GMSK signal and the first reference signal and a second correlation function of the received spread spectrum GMSK signal and the second reference signal;

determining the highest value among the punctual correlations of the evaluated first and second correlation function;

selecting the first reference signal or the second reference signal depending on the determined highest value; and determining the integration time used for performing a correlation of the received spread spectrum GMSK signal with a first or second spread spectrum code depending on the selected first reference signal or second reference signal.

4. A method for receiving a spread spectrum Gaussian Minimum Shift Keying (GMSK) signal that was generated according to the acts of:

obtaining a sequence of data symbols for a data channel;

obtaining at least one first spread spectrum code comprising a first sequence of spread spectrum chips for the data channel;

obtaining at least one second spread spectrum code comprising a second sequence of spread spectrum chips for a pilot channel;

generating a sequence of pre-modulation chips by combining the sequence of data symbols for the data channel with the spread spectrum chips of the first sequence of the at least one first spread spectrum code and data symbols for the pilot channel with the spread spectrum chips of the second sequence of the at least one second spread spectrum code to a combined sequence of chips;

assigning the chips of the combined sequence of chips to the transmission channels In-Phase I and Quadrature Q of the spread spectrum GMSK signal so that not more than two consecutive pre-modulation chips generated with the same spread spectrum code are transmitted in the same transmission channel I or Q; and performing GMSK modulation using the sequence of pre-modulation chips to generate the spread spectrum GMSK signal, wherein the method for receiving the spread spectrum GMSK signal comprising the acts of:

generating a reference signal according to the following equation:

$$S_{ref}(t) = A \left( \sum_{k=0}^{\frac{N_c-2}{2}} [a_{2k} \cdot C_0(t - 2kT_c) + b_{2k} \cdot C_0(t - (2k+1)T_c)] \right) + jA \sum_{k=0}^{\frac{N_c-2}{2}} \left[ a_{2k+1} \cdot C_0\left(t - 2kT_c - \frac{T_c}{2}\right) + b_{2k+1} \cdot C_0\left(t - (2k+1)T_c - \frac{T_c}{2}\right) \right],$$

where A denotes a coefficient of normalization of the signal, $a_k$ denotes a pilot spreading or spread spectrum code of PN sequences, $b_k$ denotes data spreading or spread spectrum code PN sequences, $T_c$ is a chip period, $N_c$ is a PN sequence length, and $C_0$ is a Gaussian filter.

5. The method of claim 4, further comprising:

replacing the data spreading or spread spectrum code PN sequences $b_k$ by a sequence of zeros with the same length for tracking the pilot channel.

6. The method of claim 4, further comprising:
replacing the pilot spreading or spread spectrum code PN sequences $a_k$ by a sequence of zeros with the same length for tracking the data channel.

7. A spread spectrum Gaussian Minimum Shift Keying (GMSK) signal generator comprising:
a data stream generator for generating a sequence of data symbols for a data channel;
a spread spectrum code generator for generating at least one first spread spectrum code comprising a first sequence of spread spectrum chips for the data channel and at least one second spread spectrum code comprising a second sequence of spread spectrum chips for a pilot channel;
a combiner for combining the sequence of data symbols for the data channel with the spread spectrum chips of the first sequence of the at least one first spread spectrum code and data symbols for the pilot channel with the spread spectrum chips of the second sequence of the at least one second spread spectrum code to a combined sequence of chips;
a pre-modulation chip sequence generator for generating a sequence of pre-modulation chips from the combined sequence of chips by assigning the chips of the combined sequence of chips to the transmission channels In-Phase I and Quadrature Q of the spread spectrum GMSK signal so that not more than two consecutive pre-modulation chips generated with the same spread spectrum code are transmitted in the same transmission channel I or Q;
a Gaussian filter for filtering the generated sequence of pre-modulation chips;
a quadrature modulator for generating an In-Phase signal by using the chips assigned to the In-Phase I transmission channel and a Quadrature signal the chips assigned to the Quadrature Q transmission channel and summing the generated In-Phase signal and Quadrature signal; and
an integrator for integrating the summed In-Phase signal and Quadrature signal to generate a spread spectrum GMSK signal,
wherein the spread spectrum code generator is adapted to generate one first spread spectrum code and one second spread spectrum code, and
wherein the pre-modulation chip sequence generator is adapted to assign pre-modulation chips generated with the first spread spectrum code to the transmission channels In-Phase I and Quadrature Q of the spread spectrum GMSK signal so that two consecutive pre-modulation chips generated with the first spectrum code are transmitted in different transmission channels I or Q, and to assign pre-modulation chips generated with the second spread spectrum code to the transmission channels In-Phase I and Quadrature Q of the spread spectrum GMSK signal so that two consecutive pre-modulation chips generated with the second spread spectrum code are transmitted in different transmission channels I or Q.

8. A spread spectrum Gaussian Minimum Shift Keying (GMSK) signal generator comprising:
a data stream generator for generating a sequence of data symbols for a data channel;
a spread spectrum code generator for generating at least one first spread spectrum code comprising a first sequence of spread spectrum chips for the data channel and at least one second spread spectrum code comprising a second sequence of spread spectrum chips for a pilot channel;
a combiner for combining the sequence of data symbols for the data channel with the spread spectrum chips of the first sequence of the at least one first spread spectrum code and data symbols for the pilot channel with the spread spectrum chips of the second sequence of the at least one second spread spectrum code to a combined sequence of chips;
a pre-modulation chip sequence generator for generating a sequence of pre-modulation chips from the combined sequence of chips by assigning the chips of the combined sequence of chips to the transmission channels In-Phase I and Quadrature Q of the spread spectrum GMSK signal so that not more than two consecutive pre-modulation chips generated with the same spread spectrum code are transmitted in the same transmission channel I or Q;
a Gaussian filter for filtering the generated sequence of pre-modulation chips;
a quadrature modulator for generating an In-Phase signal by using the chips assigned to the In-Phase I transmission channel and a Quadrature signal the chips assigned to the Quadrature Q transmission channel and summing the generated In-Phase signal and Quadrature signal; and
an integrator for integrating the summed In-Phase signal and Quadrature signal to generate a spread spectrum GMSK signal,
wherein the spread spectrum code generator is adapted to generate two or more first spread spectrum codes and two or more second spread spectrum codes, and
wherein the pre-modulation chip sequence generator is adapted to assign pre-modulation chips generated with the first spread spectrum codes to the transmission channel In-Phase I of the spread spectrum GMSK signal by interleaving the pre-modulation chips so that not more than two consecutive pre-modulation chips generated with the same one of the first spread spectrum codes are transmitted in the transmission channel I, and to assign pre-modulation chips generated with the second spread spectrum codes to the transmission channel Quadrature Q of the spread spectrum GMSK signal by interleaving the pre-modulation chips so that not more than two consecutive pre-modulation chips generated with the same one of the second spread spectrum codes are transmitted in the transmission channel Q.

9. A method comprising implementing a spread spectrum Gaussian Minimum Shift Keying (GMSK) signal generator in a Global Navigation Satellite System (GNSS) satellite configured to generate and transmit GNSS signals, wherein the spread spectrum Gaussian Minimum Shift Keying (GMSK) signal generator comprises:
a data stream generator for generating a sequence of data symbols for a data channel;
a spread spectrum code generator for generating at least one first spread spectrum code comprising a first sequence of spread spectrum chips for the data channel and at least one second spread spectrum code comprising a second sequence of spread spectrum chips for a pilot channel;
a combiner for combining the sequence of data symbols for the data channel with the spread spectrum chips of the first sequence of the at least one first spread spectrum code and data symbols for the pilot channel with the spread spectrum chips of the second sequence of the at least one second spread spectrum code to a combined sequence of chips;

a pre-modulation chip sequence generator for generating a sequence of pre-modulation chips from the combined sequence of chips by assigning the chips of the combined sequence of chips to the transmission channels In-Phase I and Quadrature Q of the spread spectrum GMSK signal so that not more than two consecutive pre-modulation chips generated with the same spread spectrum code are transmitted in the same transmission channel I or Q;

a Gaussian filter for filtering the generated sequence of pre-modulation chips;

a quadrature modulator for generating an In-Phase signal by using the chips assigned to the In-Phase I transmission channel and a Quadrature signal the chips assigned to the Quadrature Q transmission channel and summing the generated In-Phase signal and Quadrature signal; and an integrator for integrating the summed In-Phase signal and Quadrature signal to generate a spread spectrum GMSK signal.

\* \* \* \* \*